United States Patent
Yamazaki et al.

(10) Patent No.: US 11,414,157 B2
(45) Date of Patent: Aug. 16, 2022

(54) BICYCLE REAR SPROCKET ASSEMBLY

(71) Applicant: SHIMANO Inc., Sakai (JP)

(72) Inventors: Azusa Yamazaki, Sakai (JP); Kenji Kamada, Sakai (JP)

(73) Assignee: Shimano Inc., Sakai (JP)

( * ) Notice: Subject to any disclaimer, the term of this patent is extended or adjusted under 35 U.S.C. 154(b) by 546 days.

(21) Appl. No.: 16/275,767

(22) Filed: Feb. 14, 2019

(65) Prior Publication Data

US 2019/0300109 A1    Oct. 3, 2019

(30) Foreign Application Priority Data

Mar. 30, 2018  (JP) .............................. JP2018-068727

(51) Int. Cl.
*B62M 9/10*   (2006.01)
*F16H 55/30*  (2006.01)

(52) U.S. Cl.
CPC .............. *B62M 9/10* (2013.01); *F16H 55/30* (2013.01)

(58) Field of Classification Search
CPC .......... B62M 9/10; B62M 9/12; B62M 9/121; F16H 55/30
See application file for complete search history.

(56) References Cited

U.S. PATENT DOCUMENTS

| | | | | |
|---|---|---|---|---|
| 5,632,699 A | * | 5/1997 | Nakamura | B62M 9/10 474/160 |
| 5,738,603 A | * | 4/1998 | Schmidt | B62M 9/10 474/158 |
| 6,045,472 A | * | 4/2000 | Sung | B62M 9/10 474/158 |
| 6,340,338 B1 | * | 1/2002 | Kamada | B62M 9/10 474/152 |
| 9,701,364 B2 | * | 7/2017 | Sugimoto | B62M 9/105 |
| 9,885,409 B1 | * | 2/2018 | Fukunaga | B62M 9/10 |
| 9,915,336 B1 | * | 3/2018 | Fukunaga | B62M 9/10 |
| 11,028,916 B2 | * | 6/2021 | Fukunaga | B62M 9/12 |

(Continued)

FOREIGN PATENT DOCUMENTS

| | | | |
|---|---|---|---|
| CN | 105383634 A | | 3/2016 |
| CN | 106005228 A | | 10/2016 |

(Continued)

OTHER PUBLICATIONS

TW 201713554A Machine Translation (Year: 2017).*

*Primary Examiner* — Michael R Mansen
*Assistant Examiner* — Juan J Campos, Jr.
(74) *Attorney, Agent, or Firm* — Alleman Hall Creasman & Tuttle LLP

(57) ABSTRACT

It is intended to provide a bicycle rear sprocket assembly that can reduce shock in a gear shifting operation and can reduce changing of gear ratio during the gear shifting operation. A bicycle rear sprocket assembly includes a plurality of sprockets. A total tooth number of at least one of the plurality of sprockets is an even number. The plurality of sprockets have at least two coaxially arranged sprockets. At least one of the at least two coaxially arranged sprockets has an upshifting facilitation area and a downshifting facilitation area. Each of the at least two coaxially arranged sprockets has a total tooth number that is equal to or larger than eighteen. The tooth number difference is equal to or smaller than seven.

24 Claims, 12 Drawing Sheets

| SET OF TEETH | TOTAL TOOTH NUMBER | TOOTH NUMBER DIFFERENCE | TOTAL TOOTH NUMBER/ (TOOTH NUMBER DIFFERENCE/2) | | TOOTH NUMBER TRANSITION | AVERAGE OF TOOTH NUMBER TRANSITION | ENTIRE GEAR RANGE |
|---|---|---|---|---|---|---|---|
| | | | LARGE SPROCKET | SMALL SPROCKET | | | |
| SP1 | 48 | | | | | | |
| | | 6 | 16.0 | 14.0 | 1.143 | | |
| SP2 | 42 | | | | | | |
| | | 6 | 14.0 | 12.0 | 1.167 | | |
| SP3 | 36 | | | | | | |
| | | 6 | 12.0 | 10.0 | 1.200 | | |
| SP4 | 30 | | | | | | |
| | | 6 | 10.0 | 8.0 | 1.250 | | |
| SP5 | 24 | | | | | | 1.200 | 436% |
| | | 6 | 8.0 | 6.0 | 1.333 | | |
| SP6 | 18 | | | | | | |
| | | 3 | 12.0 | 10.0 | 1.200 | | |
| SP7 | 15 | | | | | | |
| | | 2 | 15.0 | 13.0 | 1.154 | | |
| SP8 | 13 | | | | | | |
| | | 2 | 13.0 | 11.0 | 1.182 | | |
| SP9 | 11 | | | | | | |

(56) References Cited

U.S. PATENT DOCUMENTS

| | | | | |
|---|---|---|---|---|
| 2002/0128097 A1* | 9/2002 | Takebayashi | B62M 25/08 | 474/58 |
| 2004/0043855 A1* | 3/2004 | Wei | B62M 9/10 | 474/160 |
| 2008/0188336 A1* | 8/2008 | Tokuyama | B62M 9/10 | 474/160 |
| 2011/0092327 A1* | 4/2011 | Oishi | B62M 9/10 | 474/160 |
| 2015/0285358 A1* | 10/2015 | Numata | F16H 55/08 | 474/160 |
| 2016/0059930 A1* | 3/2016 | Fukunaga | B62M 9/12 | 474/160 |
| 2016/0207590 A1* | 7/2016 | Fukumori | B62M 9/10 | |
| 2016/0280325 A1* | 9/2016 | Watarai | B62M 9/105 | |
| 2017/0029066 A1* | 2/2017 | Fukunaga | B62M 9/10 | |
| 2017/0361901 A1* | 12/2017 | Tokuyama | F16H 55/30 | |
| 2018/0022415 A1* | 1/2018 | Oishi | F16D 1/10 | 474/160 |
| 2018/0073620 A1* | 3/2018 | Fukunaga | B62M 9/10 | |
| 2018/0099725 A1* | 4/2018 | Kamada | F16H 55/30 | |
| 2018/0186429 A1* | 7/2018 | Nakamura | B62M 9/126 | |
| 2018/0194431 A1* | 7/2018 | Iwai | F16H 55/06 | |
| 2018/0251189 A1* | 9/2018 | Kamada | B62M 9/10 | |
| 2018/0299004 A1* | 10/2018 | Ohno | B62M 9/10 | |
| 2018/0304965 A1* | 10/2018 | Fukumori | B62M 9/10 | |
| 2019/0031288 A1* | 1/2019 | Kamada | F16H 55/30 | |
| 2019/0061873 A1* | 2/2019 | Fujita | B62M 9/10 | |
| 2019/0101204 A1* | 4/2019 | Fukunaga | B62M 9/00 | |
| 2019/0359284 A1* | 11/2019 | Fukunaga | B62M 9/10 | |
| 2019/0359285 A1* | 11/2019 | Emura | B62M 9/10 | |
| 2020/0011408 A1* | 1/2020 | Yamazaki | B62M 9/12 | |
| 2020/0140033 A1* | 5/2020 | Kamada | F16H 55/30 | |
| 2021/0031877 A1* | 2/2021 | Zubieta Andueza | B62M 9/105 | |
| 2021/0031878 A1* | 2/2021 | Zubieta Andueza | B62M 9/12 | |

FOREIGN PATENT DOCUMENTS

| | | |
|---|---|---|
| CN | 106926968 A | 7/2017 |
| JP | 2002137785 A | 5/2002 |
| TW | 201713554 A | 4/2017 |

\* cited by examiner

| SET OF TEETH | TOTAL TOOTH NUMBER | TOOTH NUMBER DIFFERENCE | TOTAL TOOTH NUMBER/ (TOOTH NUMBER DIFFERENCE/2) | | TOOTH NUMBER TRANSITION | AVERAGE OF TOOTH NUMBER TRANSITION | ENTIRE GEAR RANGE |
|---|---|---|---|---|---|---|---|
| | | | LARGE SPROCKET | SMALL SPROCKET | | | |
| SP1 | 48 | | | | | 1.200 | 436% |
| SP2 | 42 | 6 | 16.0 | 14.0 | 1.143 | | |
| SP3 | 36 | 6 | 14.0 | 12.0 | 1.167 | | |
| SP4 | 30 | 6 | 12.0 | 10.0 | 1.200 | | |
| SP5 | 24 | 6 | 10.0 | 8.0 | 1.250 | | |
| SP6 | 18 | 6 | 8.0 | 6.0 | 1.333 | | |
| SP7 | 15 | 3 | 12.0 | 10.0 | 1.200 | | |
| SP8 | 13 | 2 | 15.0 | 13.0 | 1.154 | | |
| SP9 | 11 | 2 | 13.0 | 11.0 | 1.182 | | |

FIG. 9

| SET OF TEETH | TOTAL TOOTH NUMBER | TOOTH NUMBER DIFFERENCE | TOTAL TOOTH NUMBER/(TOOTH NUMBER DIFFERENCE/2) | | TOOTH NUMBER TRANSITION | AVERAGE OF TOOTH NUMBER TRANSITION | ENTIRE GEAR RANGE |
|---|---|---|---|---|---|---|---|
| | | | LARGE SPROCKET | SMALL SPROCKET | | | |
| SP1 | 48 | | | | | 1.190 | 400% |
| SP2 | 42 | 6 | 16.0 | 14.0 | 1.143 | | |
| SP3 | 36 | 6 | 14.0 | 12.0 | 1.167 | | |
| SP4 | 30 | 6 | 12.0 | 10.0 | 1.200 | | |
| SP5 | 24 | 6 | 10.0 | 8.0 | 1.250 | | |
| SP6 | 20 | 4 | 12.0 | 10.0 | 1.200 | | |
| SP7 | 16 | 4 | 10.0 | 8.0 | 1.250 | | |
| SP8 | 14 | 2 | 16.0 | 14.0 | 1.143 | | |
| SP9 | 12 | 2 | 14.0 | 12.0 | 1.163 | | |

FIG. 10A

| SET OF TEETH | TOTAL TOOTH NUMBER | TOOTH NUMBER DIFFERENCE | TOTAL TOOTH NUMBER/ (TOOTH NUMBER DIFFERENCE/2) | | TOOTH NUMBER TRANSITION | AVERAGE OF TOOTH NUMBER TRANSITION | ENTIRE GEAR RANGE |
|---|---|---|---|---|---|---|---|
| | | | LARGE SPROCKET | SMALL SPROCKET | | | |
| SP1 | 56 | 6 | 18.7 | 16.0 | 1.167 | 1.200 | 509% |
| SP2 | 48 | 6 | 16.0 | 14.0 | 1.143 | | |
| SP3 | 42 | 6 | 14.0 | 12.0 | 1.167 | | |
| SP4 | 36 | 6 | 12.0 | 10.0 | 1.200 | | |
| SP5 | 30 | 6 | 10.0 | 8.0 | 1.250 | | |
| SP6 | 24 | 6 | 8.0 | 6.0 | 1.333 | | |
| SP7 | 18 | 3 | 12.0 | 10.0 | 1.200 | | |
| SP8 | 15 | 2 | 15.0 | 13.0 | 1.154 | | |
| SP9 | 13 | 2 | 13.0 | 11.0 | 1.182 | | |
| SP10 | 11 | | | | | | |

FIG. 10B

BICYCLE REAR SPROCKET ASSEMBLY

TECHNICAL FIELD

The present invention relates to a bicycle rear sprocket assembly.

BACKGROUND ART

A conventional bicycle rear sprocket assembly is provided to a rear wheel (see Japan Laid-open Patent Application Publication No. 2002-137785). The bicycle rear sprocket assembly includes a plurality of sprockets. Here, a tooth number difference between pairs of axially adjacent sprockets (e.g., a large sprocket and a small sprocket) is different.

SUMMARY OF INVENTION

Technical Problem

As described above, in the conventional bicycle rear sprocket assembly, a tooth number difference between pairs of adjacent large and small sprockets is different. For example, when the tooth number difference between a pair of large and small sprockets is large and, for example, is equal to or larger than eight, shock is intense in a gear shifting operation. Additionally, the tooth number difference between a pair of adjacent large and small sprockets is large, a rider has difficulty in selecting a desired gear ratio.

The present invention has been produced in view of the aforementioned drawback. It is an object of the present invention to provide a bicycle rear sprocket assembly that can reduce shock in a gear shifting operation and can reduce changing of gear ratio during the gear shifting operation.

Solution to Problem

In accordance with a first aspect of the present invention, a bicycle rear sprocket assembly comprises a plurality of sprockets. The plurality of sprockets include at least two coaxially arranged sprockets. A total tooth number of at least one of the plurality of sprockets is an even number. At least one of the at least two coaxially arranged sprockets has an upshifting facilitation area and a downshifting facilitation area. Each of the at least two coaxially arranged sprockets has a total tooth number that is equal to or larger than eighteen.

A tooth number difference is defined between a large sprocket of the at least two coaxially arranged sprockets and a small sprocket of the at least two coaxially arranged sprockets. The large sprocket and the small sprocket are adjacent to each other without another sprocket therebetween in an axial direction with respect to a rotational center axis of the at least two coaxially arranged sprockets. The tooth number difference is equal to or smaller than seven.

With the rear sprocket assembly according to the first aspect, the at least one of the at least two coaxially arranged sprockets has the upshifting facilitation area and the downshifting facilitation area. Each of the at least two coaxially arranged sprockets has the total tooth number that is equal to or larger than eighteen. The tooth number difference is equal to or smaller than seven.

With this configuration, it is possible to reduce shock during a gear shifting operation and to reduce changing of gear ratio during the gear shifting operation. In other words, it is possible to reduce shock received by a rider during the gear shifting operation and select a gear ratio desired by the rider.

In accordance with a second aspect of the present invention, the bicycle rear sprocket assembly according to the first aspect is configured so that the at least two coaxially arranged sprockets include at least three coaxially arranged sprockets.

A plurality of tooth number transitions of the at least two coaxially arranged sprockets are defined by a quotient in which a total tooth number of the large sprocket of the at least two coaxially arranged sprockets is divided by a total tooth number of the small sprocket of the at least two coaxially arranged sprockets. An average of the plurality of tooth number transitions is equal to or smaller than 1.23.

With the rear sprocket assembly according to the second aspect, the average of the plurality of tooth number transitions is equal to or smaller than 1.23. Accordingly, it is possible to reduce changing of gear ratio during the gear shifting operation. In other words, it is possible to suitably select a gear ratio desired by the rider.

In accordance with a third aspect of the present invention, the bicycle rear sprocket assembly according to the second aspect is configured so that the average of the plurality of tooth number transitions is equal to or smaller than 1.2.

With the rear sprocket assembly according to the third aspect, it is possible to further reduce changing of gear ratio during the gear shifting operation. In other words, it is possible to more suitably select a gear ratio desired by the rider.

In accordance with a fourth aspect of the present invention, the bicycle rear sprocket assembly according to the third aspect is configured so that the average of the plurality of tooth number transitions is equal to smaller than 1.19.

With the rear sprocket assembly according to the fourth aspect, it is possible to further reduce changing of gear ratio during the gear shifting operation. In other words, it is possible to more suitably select a gear ratio desired by the rider.

In accordance with a fifth aspect of the present invention, the bicycle rear sprocket assembly according to any one of the first to fourth aspects is configured so that a quotient resulting from the total tooth number of the large sprocket divided by half of the tooth number difference is an even number.

With the rear sprocket assembly according to the fifth aspect, it is possible to suitably lead a bicycle chain to a shifting facilitation area for shifting from the small sprocket to the large sprocket in a chain phase in which shock can be reduced during the gear shifting operation of the bicycle chain from the large sprocket to the small sprocket.

In accordance with a sixth aspect of the present invention, the bicycle rear sprocket assembly according to any one of the first to fifth aspects is configured so that a quotient resulting from the total tooth number of the small sprocket divided by half of the tooth number difference is an even number.

With the rear sprocket assembly according to the sixth aspect, it is possible to suitably lead a bicycle chain to a shifting facilitation area for shifting from the small sprocket to the large sprocket in a chain phase in which shock can be reduced during the gear shifting operation of the bicycle chain from the large sprocket to the small sprocket.

In accordance with a seventh aspect of the present invention, the bicycle rear sprocket assembly according to any one of the first to sixth aspects is configured so that a quotient resulting from the total tooth number of the large sprocket divided by the tooth number difference is an integer.

With the rear sprocket assembly according to the seventh aspect, shock can be suitably reduced during the gear shifting operation.

In accordance with an eighth aspect of the present invention, the bicycle rear sprocket assembly according to any one of the first to seventh aspects is configured so that a quotient resulting from the total tooth number of the small sprocket divided by the tooth number difference is an integer.

With the rear sprocket assembly according to the eighth aspect, shock can be suitably reduced during the gear shifting operation.

In accordance with a ninth aspect of the present invention, the bicycle rear sprocket assembly according to any one of the first to eighth aspects is configured so that the large sprocket has the upshifting facilitation area and the downshifting facilitation area.

With the rear sprocket assembly according to the ninth aspect, shock can be reduced during the upshifting operation and the downshifting operation.

In accordance with a tenth aspect of the present invention, the bicycle rear sprocket assembly according to ninth aspect is configured so that the small sprocket has an additional upshifting facilitation area and an additional downshifting facilitation area.

With the rear sprocket assembly according to the tenth aspect, shock can be reduced during the upshifting operation and the downshifting operation, and furthermore, the gear shifting operation can be quickly performed.

In accordance with an eleventh aspect of the present invention, the bicycle rear sprocket assembly according to any one of the first to tenth aspects is configured so that an axially recessed tooth in the axial direction is disposed in at least one of the upshifting facilitation area and the downshifting facilitation area.

With the rear sprocket assembly according to the eleventh aspect, shock can be reduced during the gear shifting operation.

In accordance with a twelfth aspect of the present invention, the bicycle rear sprocket assembly according to any one of the first to eleventh aspects is configured so that an entire gear range is defined as a ratio of a total tooth number of a largest sprocket to a total tooth number of a smallest sprocket. The entire gear range is equal to or larger than 350%.

With the rear sprocket assembly according to the twelfth aspect, it is possible to suitably select a gear ratio desired by the rider.

In accordance with a thirteenth aspect of the present invention, the bicycle rear sprocket assembly according to twelfth aspect is configured so that the entire gear range is equal to or larger than 400%.

With the rear sprocket assembly according to the thirteenth aspect, it is possible to more suitably select a gear ratio desired by the rider.

In accordance with a fourteenth aspect of the present invention, the bicycle rear sprocket assembly according to any one of the first to eleventh aspects is configured so that a total tooth number of a smallest sprocket is equal to or smaller than twelve.

With the rear sprocket assembly according to the fourteenth aspect, it is possible to enlarge a selection range of gear ratios on a top gear side.

In accordance with a fifteenth aspect of the present invention, the bicycle rear sprocket assembly according to any one of the first to eleventh aspects is configured so that a total tooth number of a largest sprocket is equal to or larger than forty-four.

With the rear sprocket assembly according to the fifteenth aspect, it is possible to enlarge a selection range of gear ratios on a low gear side.

In accordance with a sixteenth aspect of the present invention, the bicycle rear sprocket assembly according to the first aspect is configured so that a total number of the at least two coaxially arranged sprockets is equal to or larger than nine.

With the rear sprocket assembly according to the sixteenth aspect, it is possible to suitably select a gear ratio desired by the rider.

In accordance with a seventeenth aspect of the present invention, the bicycle rear sprocket assembly according to any one of the second to fourth aspects is configured so that the at least two coaxially arranged sprockets includes at least five coaxially arranged sprockets.

With the rear sprocket assembly according to the seventeenth aspect, it is possible to suitably select a gear ratio desired by the rider.

In accordance with an eighteenth aspect of the present invention, the bicycle rear sprocket assembly according to the seventeenth aspect is configured so that the plurality of tooth number transitions are defined by a quotient in which a total tooth number of a large sprocket of the at least five coaxially arranged sprockets is divided by a total tooth number of a small sprocket of the at least five coaxially arranged sprockets. The large sprocket and the small sprocket are adjacent to each other without another sprocket therebetween in the axial direction.

With the rear sprocket assembly according to the eighteenth aspect, it is possible to more suitably select a gear ratio desired by the rider.

In accordance with a nineteenth aspect of the present invention, the bicycle rear sprocket assembly according to the seventeenth aspect is configured so that each of the at least five coaxially arranged sprockets has a total tooth number that is equal to or larger than eighteen. At least one of the at least five coaxially arranged sprockets includes a plurality of sprocket teeth. The plurality of sprocket teeth include a first tooth having a first chain-engagement axial width and a second tooth having a second chain-engagement axial width that is smaller than the first chain-engagement axial width.

With the rear sprocket assembly according to the nineteenth aspect, it is possible to enhance a function to support the chain by the sprocket.

In accordance with a twentieth aspect of the present invention, the bicycle rear sprocket assembly according to any one of the first to sixteenth aspects is configured so that at least one of the plurality of sprockets includes a plurality of sprocket teeth. The plurality of sprocket teeth include a first tooth having a first chain-engagement axial width and a second tooth having a second chain-engagement axial width that is smaller than the first chain-engagement axial width.

With the rear sprocket assembly according to the twentieth aspect, it is possible to enhance the function to support the chain by the sprocket.

In accordance with a twenty-first aspect of the present invention, the bicycle rear sprocket assembly according to any one of the first to twentieth aspects is configured so that the tooth number difference is equal to or smaller than six.

With the rear sprocket assembly according to the twenty-first aspect, it is possible to more suitably select a gear ratio desired by the rider.

In accordance with a twenty-second aspect of the present invention, a bicycle rear sprocket assembly comprises a plurality of sprockets. The plurality of sprockets include at least five coaxially arranged sprockets. A total tooth number of at least one of the at least five coaxially arranged sprockets is an even number.

At least one of the plurality of sprockets includes a plurality of sprocket teeth. The plurality of sprocket teeth include a first tooth having a first chain-engagement axial width and a second tooth having a second chain-engagement axial width that is smaller than the first chain-engagement axial width.

At least one of the at least five coaxially arranged sprockets has an upshifting facilitation area and a downshifting facilitation area. A plurality of tooth number transitions of the at least five coaxially arranged sprockets are defined by a quotient in which a total tooth number of a large sprocket of the at least five coaxially arranged sprockets is divided by a total tooth number of a small sprocket of the at least five coaxially arranged sprockets.

The large sprocket and the small sprocket are adjacent to each other without another sprocket therebetween in an axial direction with respect to a rotational center axis of the at least five coaxially arranged sprockets. An average of the plurality of tooth number transitions is equal to or smaller than 1.23.

With the rear sprocket assembly according to the twenty-second aspect, the plurality of sprocket teeth of the at least one sprocket in the plurality of sprockets include the first tooth having the first chain-engagement axial width and the second tooth having the second chain-engagement axial width that is smaller than the first chain-engagement axial width. The at least one of the at least five coaxially arranged sprockets has the upshifting facilitation area and the downshifting facilitation area. The average of the plurality of tooth number transitions is equal to or smaller than 1.23.

With this configuration, it is possible to reduce shock during the gear shifting operation, reduce changing of gear ratio during the gear shifting operation, and enhance the force to hold the chain by the sprocket. In other words, it is possible to reduce shock received by the rider during the gear shifting operation, select a gear ratio desired by the rider, and suitably transmit a driving force by the rider to the sprocket through the chain.

In accordance with a twenty-third aspect of the present invention, the bicycle rear sprocket assembly according to any one of the nineteenth, twentieth and twenty-second aspects is configured so that the first chain-engagement axial width of the first tooth is larger than an inner link space defined between a pair of inner link plates of a bicycle chain and smaller than an outer link space defined between a pair of outer link plates of the bicycle chain. The second chain-engagement axial width of the second tooth is smaller than the inner link space of the bicycle chain.

With the rear sprocket assembly according to the twenty-third aspect, it is possible to suitably enhance the function to support the chain by the sprocket. In other words, it is possible to more suitably transmit the driving force by the rider to the sprocket through the chain.

In accordance with a twenty-fourth aspect of the present invention, the bicycle rear sprocket assembly according to the twenty-second or twenty-third aspect is configured so that the average of the plurality of tooth number transitions is equal to or smaller than 1.2.

With the rear sprocket assembly according to the twenty-fourth aspect, it is possible to further reduce changing of gear ratio during the gear shifting operation. In other words, it is possible to more suitably select a gear ratio desired by the rider.

In accordance with a twenty-fifth aspect of the present invention, the bicycle rear sprocket assembly according to any one of the twenty-second to twenty-fourth aspects is configured so that the average of the plurality of tooth number transitions is equal to or smaller than 1.19.

With the rear sprocket assembly according to the twenty-fifth aspect, it is possible to further reduce changing of gear ratio during the gear shifting operation. In other words, it is possible to more suitably select a gear ratio desired by the rider.

Advantageous Effects of Invention

With a bicycle rear sprocket assembly of the present invention, it is possible to reduce shock during a gear shifting operation and reduce changing of gear ratio during the gear shifting operation.

BRIEF DESCRIPTION OF THE DRAWINGS

FIG. 9 is a chart for explaining features of the sprockets.
FIG. 10A is a chart for explaining features of sprockets in another embodiment.
FIG. 10B is a chart for explaining features of sprockets in yet another embodiment.

DETAILED DESCRIPTION OF EMBODIMENTS

Figure 1:
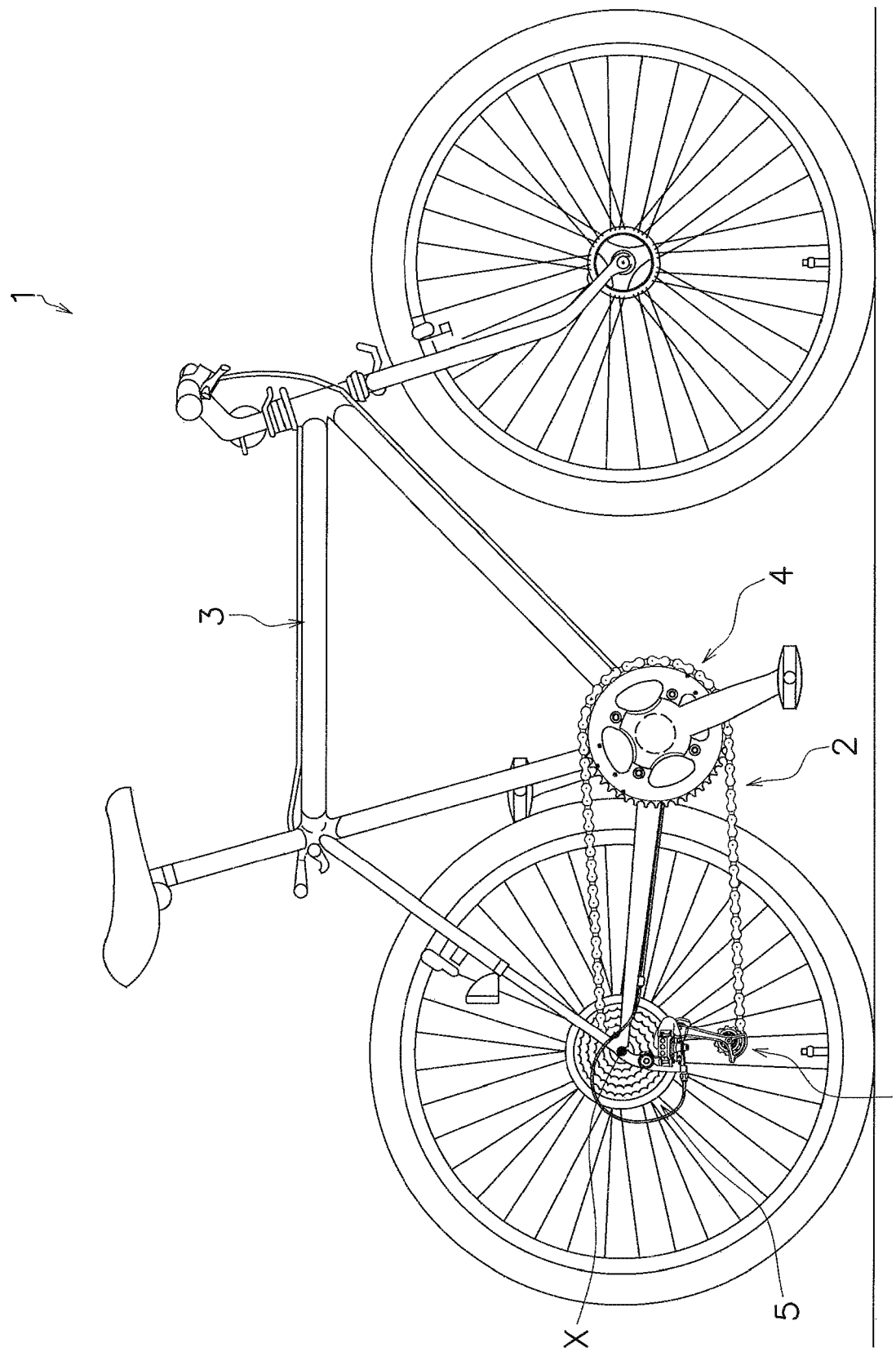
FIG. 1 is a front view of a bicycle according to an embodiment of the present invention.

Selected embodiments will now be described with reference to the accompanying drawings, wherein like reference numerals designate corresponding or identical elements throughout the various drawings.

As shown in FIG. 1, a bicycle 1 according to an embodiment of the present invention includes a bicycle chain 2, a bicycle front sprocket assembly 4 and a bicycle rear sprocket assembly 5. The bicycle chain 2 is wrapped around the bicycle front sprocket assembly 4 and the bicycle rear sprocket assembly 5.

The bicycle front sprocket assembly 4, the bicycle rear sprocket assembly 5 and the bicycle chain 2 compose a drivetrain. A driving force from the bicycle front sprocket assembly 4 is transmitted to the bicycle rear sprocket assembly 5 through the bicycle chain 2. The bicycle rear sprocket assembly 5 is mounted to a rear hub (not shown in the drawings), which is rotatable with respect to a frame 3, so as to be unitarily rotatable therewith.

Configuration of Rear Sprocket Assembly

Figure 2:
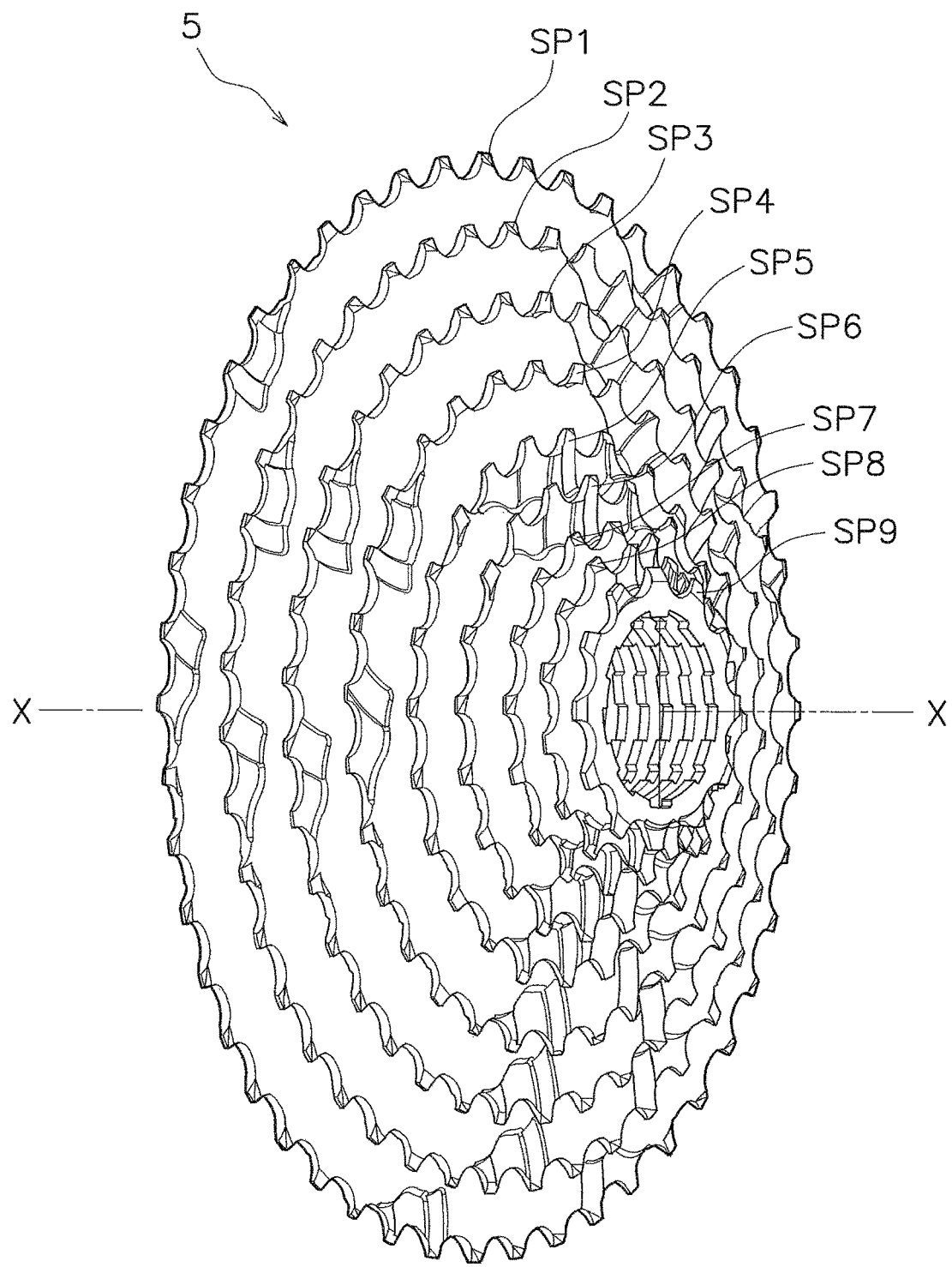
FIG. 2 is a perspective view of a bicycle rear sprocket assembly.

As shown in FIG. 2, the bicycle rear sprocket assembly 5 has a rotational center axis X. The bicycle rear sprocket assembly 5 comprises a plurality of sprockets SP1 to SP9. In other words, the bicycle rear sprocket assembly 5 includes at least five coaxially arranged sprockets. The at least five coaxially arranged sprockets share the rotational center axis X as the common rotational center axis thereof, and are disposed to be coaxial to each other about the rotational center axis X. The number of the plurality of sprockets SP1 to SP9 is preferably equal to or larger than nine.

The plurality of sprockets SP1 to SP9 include at least two coaxially arranged sprockets. The at least two coaxially arranged sprockets each have the rotational center axis X as the common rotational center axis thereof, and are disposed coaxially to each other about the rotational center axis X. In the present embodiment, at least two sprockets among the plurality of sprockets SP1 to SP9 correspond to the at least two coaxially arranged sprockets. The number of the at least two coaxially arranged sprockets is preferably equal to or larger than nine.

The at least two coaxially arranged sprockets include at least three coaxially arranged sprockets. In this case, the number of the at least two coaxially arranged sprockets is equal to or larger than three. In the present embodiment, at least three sprockets among the plurality of sprockets SP1 to SP9 correspond to the at least three coaxially arranged sprockets. The at least three sprockets among the plurality of sprockets SP1 to SP9 include the aforementioned at least two coaxially arranged sprockets.

The at least two coaxially arranged sprockets include the at least five coaxially arranged sprockets. In this case, the number of the at least two coaxially arranged sprockets is equal to or larger than five. In the present embodiment, at least five sprockets among the plurality of sprockets SP1 to SP9 correspond to the at least five coaxially arranged sprockets. In other words, the bicycle rear sprocket assembly 5 comprises the plurality of sprockets SP1 to SP9 including the at least five coaxially arranged sprockets. The at least five sprockets among the plurality of sprockets SP1 to SP9 include the aforementioned at least two coaxially arranged sprockets and the aforementioned at least three coaxially arranged sprockets.

Configuration of Sprockets

The plurality of sprockets SP1 to SP9 will be hereinafter referred to as first to ninth sprockets SP1 to SP9 on an as-needed basis. Additionally, six sprockets SP1 to SP6 in the plurality of sprockets SP1 to SP9 (the nine sprockets SP1 to SP9), for example, the first to sixth sprockets SP1 to SP6 correspond to the aforementioned "at least two coaxially arranged sprockets," "at least three coaxially arranged sprockets," and "at least five coaxially arranged sprockets."

As shown in FIG. 2, the respective first to ninth sprockets SP1 to SP9 are disposed in alignment in the axial direction with respect to the rotational center axis X. In other words, the respective first to ninth sprockets SP1 to SP9 are disposed coaxially about the rotational center axis X. Spacers (not shown in the drawings) are respectively disposed between axially adjacent pairs of the first to ninth sprockets SP1 to SP9.

Here, the first sprocket SP1 is a sprocket with the largest diameter. The ninth sprocket SP9 is a sprocket with the smallest diameter. The second to eighth sprockets SP2 to SP8 are disposed between the first sprocket SP1 and the ninth sprocket SP9 in the axial direction with respect to the rotational center axis X.

Each of axially adjacent pairs of sprockets (a large sprocket and a small sprocket) in the first to ninth sprockets SP1 to SP9 is adjacent to each other without another sprocket therebetween. In other words, the large sprocket and the small sprocket are adjacent to each other without another sprocket therebetween in the axial direction with respect to the rotational center axis X of the at least two coaxially arranged sprockets, the at least three coaxially arranged sprockets, or the at least five coaxially arranged sprockets.

Gear Shifting Promotive Regions

Figure 3A:
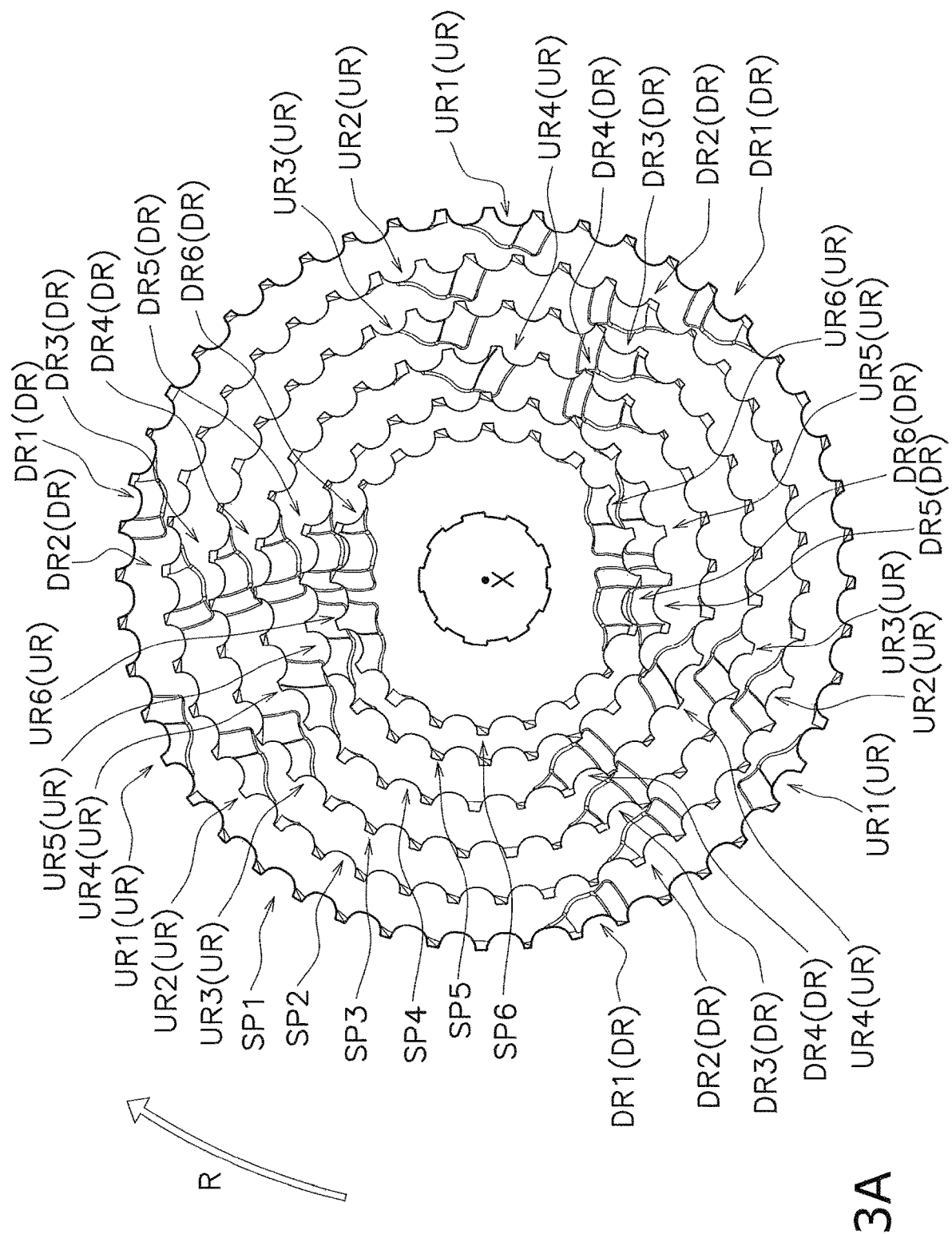
FIG. 3A is a front view of first to sixth sprockets.

As shown in FIG. 3A, at least one of the at least two coaxially arranged sprockets in the plurality of sprockets SP1 to SP9 has upshifting facilitation areas UR and downshifting facilitation areas DR. Specifically, at least one of the at least five coaxially arranged sprockets in the plurality of sprockets SP1 to SP9 has the upshifting facilitation areas UR and the downshifting facilitation areas DR. For example, in the present embodiment, each of the first to sixth sprockets SP1 to SP6 has the upshifting facilitation areas UR and the downshifting facilitation areas DR.

In the present invention, a downshifting operation means a gear shifting operation in which the bicycle chain 2 shifts toward any downshifting facilitation area DR. A downshifting operation means a gear shifting operation in which the bicycle chain 2 shifts from the large sprocket to the small sprocket. The upshifting facilitation area UR is an area intentionally designed to facilitate shifting of the bicycle chain 2 from a small sprocket to a large sprocket. The downshifting facilitation area DR is an area intentionally designed to facilitate shifting of the bicycle chain 2 from a large sprocket to a small sprocket. In the present embodiment, each of the first to sixth sprockets SP1 to SP6 includes the upshifting facilitation areas UR (UR1 to UR6) and the downshifting facilitation areas DR (DR1 to DR6). Regarding the gear shifting operation between a large sprocket and a small sprocket adjacent to each other, the upshifting facilitation area UR and the downshifting facilitation area DR are provided on the large sprocket.

In other words, the large sprocket of the two coaxially arranged sprockets axially adjacent to each other in the first to sixth sprockets SP1 to SP6 includes the upshifting facilitation areas UR (UR1 to UR6) and the downshifting facilitation areas DR (DR1 to DR6).

The small sprocket of the two axially adjacent sprockets in the first to sixth sprockets SP1 to SP6 includes the upshifting facilitation areas UR (UR1 to UR6; an example of additional upshifting facilitation areas UR) and the downshifting facilitation areas DR (DR1 to DR6; an example of additional downshifting facilitation areas DR).

Figure 4:
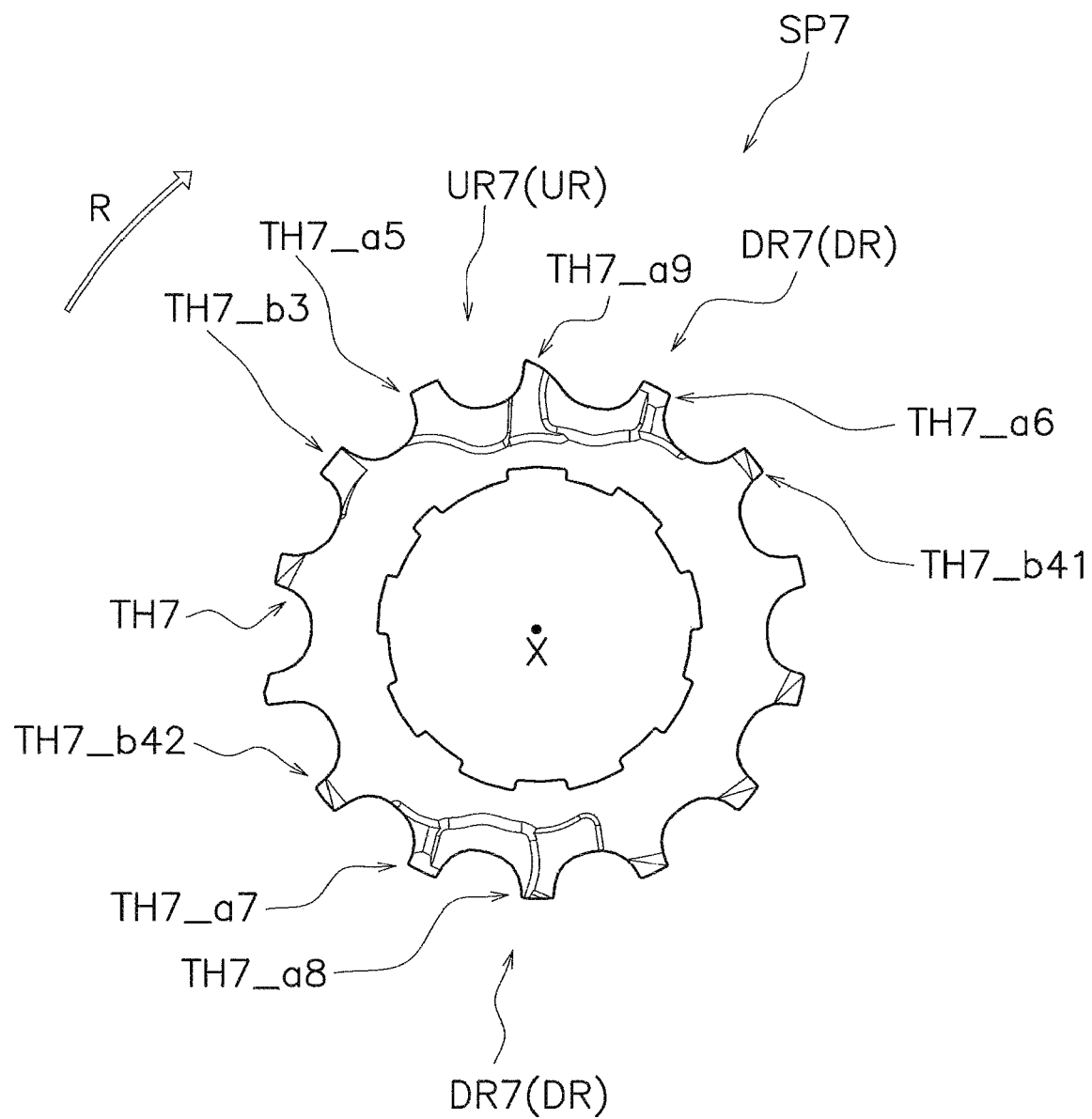
FIG. 4 is a front view of a seventh sprocket.
Figure 5:
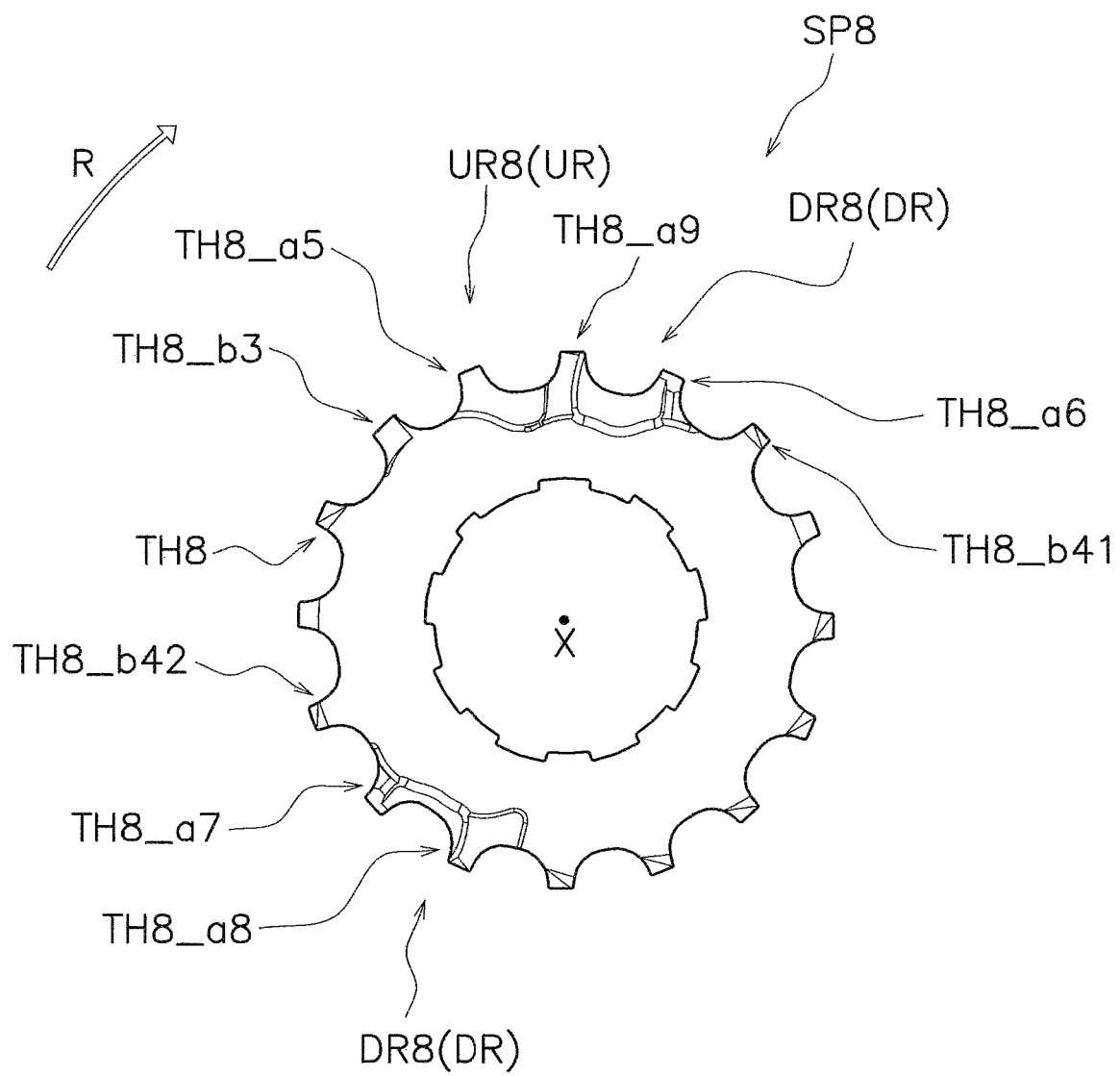
FIG. 5 is a front view of an eighth sprocket.
Figure 6:
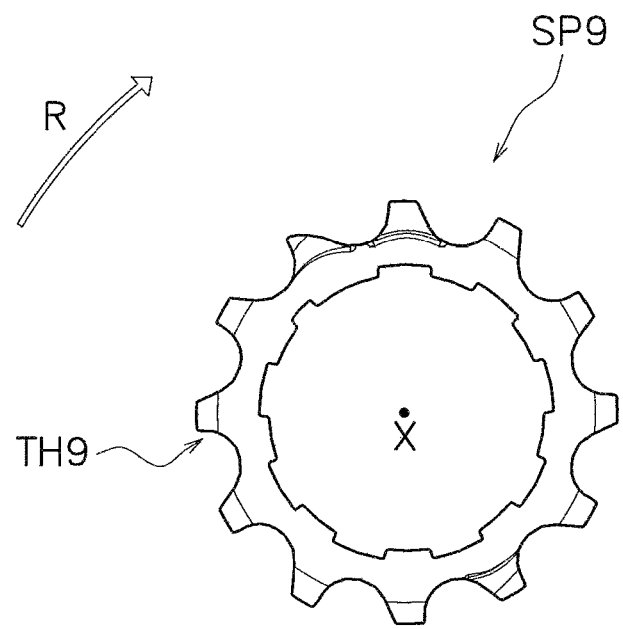
FIG. 6 is a front view of a ninth sprocket.

As shown in FIGS. 4 and 5, each of the seventh and eighth sprockets SP7 and SP8 also includes the upshifting facilitation area UR and the downshifting facilitation areas DR. Specifically, each of the seventh sprocket SP7 corresponding to the large sprocket and the eighth sprocket SP8 corresponding to the small sprocket includes the upshifting facilitation area UR (UR7, UR8) and the downshifting facilitation areas DR (DR7, DR8). It should be noted that as shown in FIG. 6, the ninth sprocket SP9 is not provided with any upshifting facilitation area UR and any downshifting facilitation area DR.

Sprocket Teeth

As shown in FIGS. 3B, 4, 5 and 6, at least one of the first to ninth sprockets SP1 to SP9 includes a plurality of sprocket teeth. Here, the first to ninth sprockets SP1 to SP9 respectively include sets of a plurality of sprocket teeth TH1 to TH9. Each of "TH1 to TH9" is a reference character that indicates all the plurality of sprocket teeth in each of the sprockets SP1 to SP9.

In each of the sets of a plurality of sprocket teeth TH1 to TH9, the sprocket teeth are provided on the outer peripheral part of each of the first to ninth sprockets SP1 to SP9, while being disposed at intervals in a circumferential direction about the rotational center axis X.

Figure 3B:
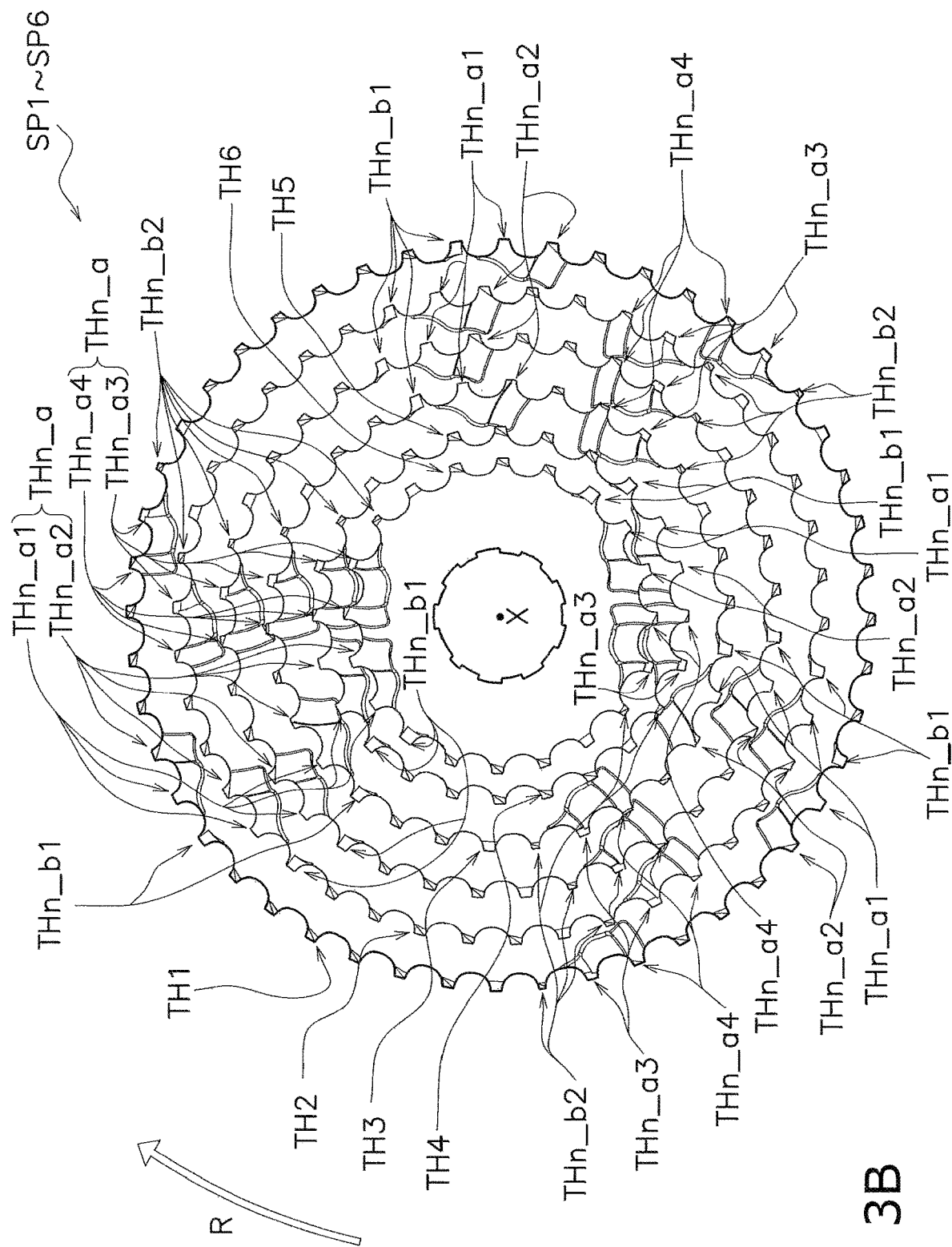
FIG. 3B is a front view of the first to sixth sprockets.

As shown in FIGS. 3B, 4 and 5, in each of the first to eighth sprockets SP1 to SP8, axially recessed teeth TH1_a to TH8_a in the axial direction are disposed in at least one of the upshifting facilitation areas UR (UR1 to UR8) and the downshifting facilitation areas DR (DR1 to DR8). Preferably, the axially recessed teeth TH1_a to TH8_a are disposed in each of the upshifting facilitation areas UR (UR1 to UR8) and the downshifting facilitation areas DR (DR1 to DR8).

Specifically, as shown in FIG. 3B, in each of the first to sixth sprockets SP1 to SP6, axially recessed teeth THn_a (n is a positive integer ranging from 1 to 6) include axially recessed teeth THn_a1 and THn_a2 disposed in each upshifting facilitation area UR shown in FIG. 3A and axially recessed teeth THn_a3 and THn_a4 disposed in each downshifting facilitation area DR shown in FIG. 3A.

Specifically, in each of the first to sixth sprockets SP1 to SP6, an upshifting initiation tooth THn_b1 and the axially recessed teeth THn_a1 and THn_a2 are disposed in each upshifting facilitation area UR. "n" is a positive integer ranging from 1 to 6. In other words, each upshifting facilitation area UR is an area that includes the upshifting initiation tooth THn_b1 and the axially recessed teeth THn_a1 and THn_a2.

The upshifting initiation tooth THn_b1 is a tooth of the large sprocket, at which the bicycle chain 2 starts engaging in the upshifting operation from the small sprocket to the large sprocket. For example, the upshifting initiation tooth THn_b1 is disposed between a pair of outer link plates opposed to each other in the upshifting operation.

Figure 7:
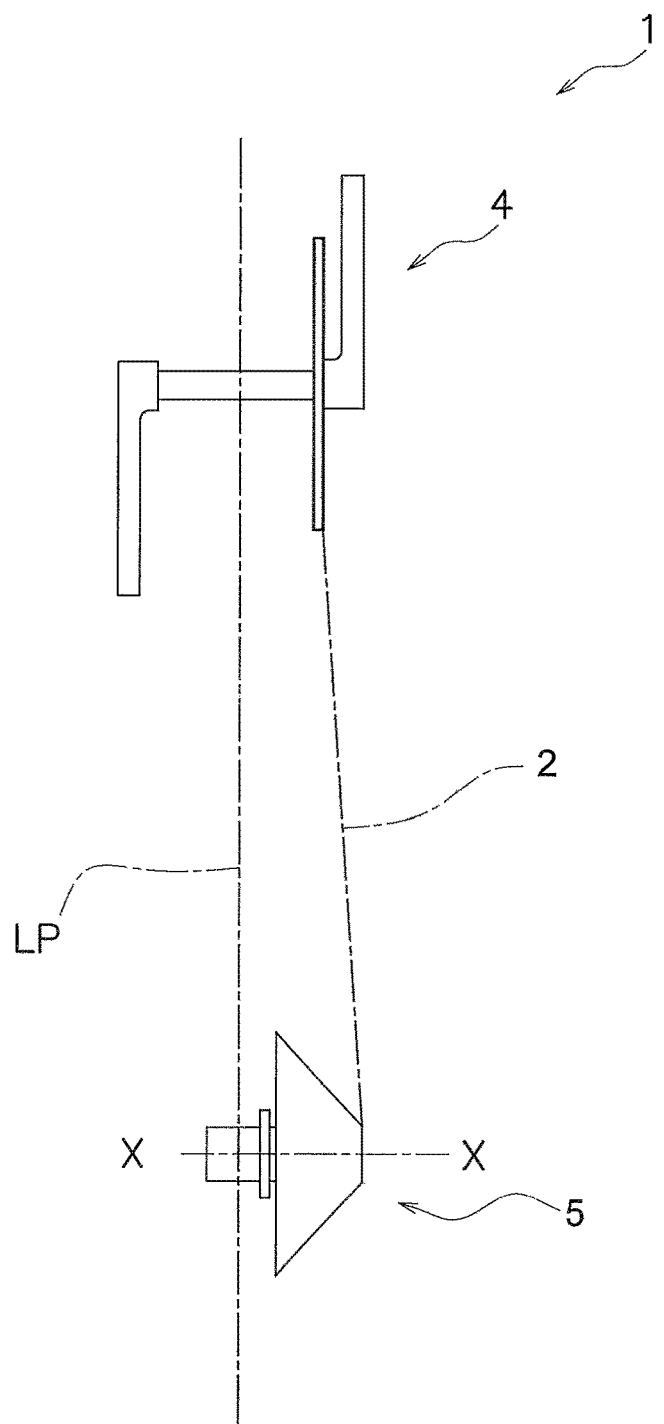
FIG. 7 is a schematic view of a bicycle front sprocket assembly and the bicycle rear sprocket assembly as seen from above.

As shown in FIGS. 3B and 7, the axially recessed teeth THn_a1 and THn_a2 are shaped to be recessed in the axial direction with respect to the rotational center axis X such that one of a pair of inner link plates opposed to each other, which is located on a lengthwise directional center surface LP side of the bicycle 1 while the bicycle chain 2 is mounted to the bicycle 1, and one of a pair of outer link plates opposed to each other, which is located on the lengthwise directional center surface LP side of the bicycle 1 while the bicycle chain 2 is mounted to the bicycle 1, are disposed on the axially recessed teeth THn_a1 and THn_a2 in the upshifting operation.

In each of the first to sixth sprockets SP1 to SP6, a downshifting finally engaged tooth THn_b2 and the axially recessed teeth THn_a3 and THn_a4 are disposed in each downshifting facilitation area DR. "n" is a positive integer ranging from 1 to 6.

The downshifting finally engaged tooth THn_b2 is a tooth of the large sprocket with which the bicycle chain 2 finally engages immediately before the bicycle chain 2 starts being disengaged from the large sprocket in the downshifting operation from the large sprocket to the small sprocket. For example, the downshifting finally engaged tooth THn_b2 is disposed between a pair of outer link plates in the downshifting operation. In the present embodiment, the tooth number disposed between the upshifting initiation tooth THn_b1 and the downshifting finally engaged tooth THn_b2 is an odd number.

As shown in FIGS. 3B and 7, the axially recessed teeth THn_a3 and THn_a4 are shaped to be recessed in the axial direction with respect to the rotational center axis X such that one of a pair of inner link plates opposed to each other, which is located on the lengthwise directional center surface LP side of the bicycle 1 while the bicycle chain 2 is mounted to the bicycle 1, and one of a pair of outer link plates opposed to each other, which is located on the lengthwise directional center surface LP side of the bicycle 1 while the bicycle chain 2 is mounted to the bicycle 1, are disposed on the axially recessed teeth THn_a3 and THn_a4 in the downshifting operation.

As shown in FIGS. 4 and 5, in each of the seventh and eighth sprockets SP7 and SP8, the axially recessed teeth THn_a (n is a positive integer of 7 or 8) include an axially recessed tooth THn_a5 disposed in the upshifting facilitation area UR and axially recessed teeth THn_a6, THn_a7 and THn_a8 disposed in the downshifting facilitation areas DR.

In each of the seventh and eighth sprockets SP7 and SP8, the axially recessed teeth THn_a further include an axially recessed tooth THn_a9 disposed in both the upshifting facilitation area UR and the downshifting facilitation area DR.

Specifically, in each of the seventh and eighth sprockets SP7 and SP8, an upshifting initiation tooth THn_b3 and the axially recessed teeth THn_a5 and THn_a9 are disposed in the upshifting facilitation area UR. "n" is any one of 7 and 8.

The upshifting initiation tooth THn_b3 is a tooth of the large sprocket at which the bicycle chain 2 starts engaging with the large sprocket in the upshifting operation from the small sprocket to the large sprocket. For example, the upshifting initiation tooth THn_b3 is disposed between a pair of outer link plates opposed to each other in the upshifting operation.

As shown in FIGS. 4, 5 and 7, the axially recessed teeth THn_a5 and THn_a9 are shaped to be recessed in the axial direction with respect to the rotational center axis X such that one of a pair of inner link plates opposed to each other, which is located on the lengthwise directional center surface LP side of the bicycle 1 while the bicycle chain 2 is mounted to the bicycle 1, and one of a pair of outer link plates opposed to each other, which is located on the lengthwise directional center surface LP side of the bicycle 1 while the bicycle chain 2 is mounted to the bicycle 1, are disposed on the axially recessed teeth THn_a5 and THn_a9.

Here, when the outer link plates engage with the upshifting initiation tooth THn_b3, the inner link plate, which is located on the lengthwise directional center surface LP side of the bicycle 1 while the bicycle chain 2 is mounted to the bicycle 1, is disposed on the axially recessed tooth THn_a5. The outer link plate, which is located on the lengthwise directional center surface LP side of the bicycle 1 while the bicycle chain 2 is mounted to the bicycle 1, is disposed on the axially recessed tooth THn_a9.

In each of the seventh and eighth sprockets SP7 and SP8, downshifting finally engaged teeth THn_b41 and THn_b42 and the axially recessed teeth THn_a6, THn_a7, THn_a8 and THn_a9 are disposed in the downshifting facilitation areas DR. "n" is any one of 7 and 8.

The downshifting finally engaged teeth THn_b41 and THn_b42 are teeth of the large sprocket with which the bicycle chain 2 is finally engaged immediately before the bicycle chain 2 starts being disengaged from the large sprocket in the downshifting operation from the large sprocket to the small sprocket. For example, each of the downshifting finally engaged teeth THn_b41 and THn_b42 is disposed between a pair of outer link plates in the downshifting operation.

The axially recessed teeth THn_a6, THn_a7, THn_a8 and THn_a9 are shaped to be recessed in the axial direction with respect to the rotational center axis X such that one of a pair of inner link plates opposed to each other, which is located on the lengthwise directional center surface LP side of the bicycle 1 while the bicycle chain 2 is mounted to the bicycle 1, and one of a pair of outer link plates opposed to each other, which is located on the lengthwise directional center surface LP side of the bicycle 1 while the bicycle chain 2 is mounted to the bicycle 1, are disposed on the axially recessed teeth THn_a6, THn_a7, THn_a8 and THn_a9.

Here, when the outer link plates engage with the downshifting finally engaged tooth THn_b41, the inner link plate, which is located on the lengthwise directional center surface LP side of the bicycle 1 while the bicycle chain 2 is mounted to the bicycle 1, is disposed on the axially recessed tooth THn_a6. The outer link plate, which is located on the lengthwise directional center surface LP side of the bicycle 1 while the bicycle chain 2 is mounted to the bicycle 1, is disposed on the axially recessed tooth THn_a9.

When the outer link plates engage with the downshifting finally engaged tooth THn_b42, the inner link plate, which is located on the lengthwise directional center surface LP side of the bicycle 1 while the bicycle chain 2 is mounted to the bicycle 1, is disposed on the axially recessed tooth THn_a7. The outer link plate, which is located on the lengthwise directional center surface LP side of the bicycle 1 while the bicycle chain 2 is mounted to the bicycle 1, is disposed on the axially recessed tooth THn_a8.

Tooth Tip Shape of Sprocket Teeth

At least one of the plurality of first to ninth sprockets SP1 to SP9 includes a plurality of sprocket teeth (as described below). Specifically, at least one of the at least five coaxially arranged sprockets, for example, at least one of the first to sixth sprockets SP1 to SP6, includes a plurality of sprocket teeth (as described below).

In the present embodiment, each of the sets of sprocket teeth TH1 to TH6 of the first to sixth sprockets SP1 to SP6 may have the following configuration.

Figure 8:
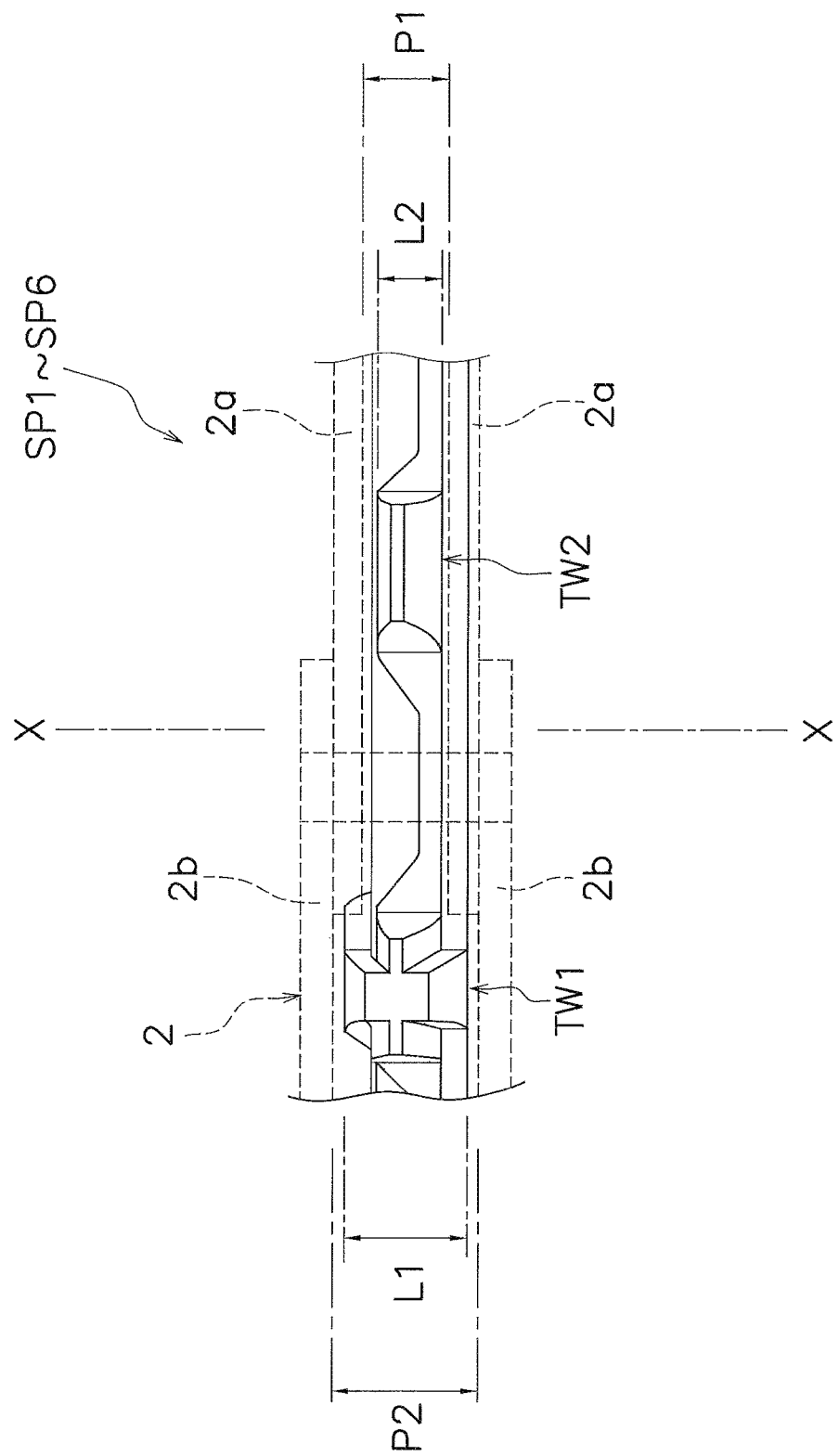
FIG. 8 is a diagram for explaining sprocket teeth of the first to sixth sprockets.

First tooth TW1 and second tooth TW2 are included in each of the sprocket teeth TH1 to TH6. As shown in FIG. 8, the plurality of sprocket teeth TH1 to TH6 include the first teeth TW1 having a first chain-engagement axial width L1, and the second teeth TW2 having a second chain-engagement axial width L2 that is smaller than the first chain-engagement axial width L1.

For example, at least one of the first to sixth sprockets SP1 to SP6 may include the plurality of first teeth TW1 and the plurality of second teeth TW2. Specifically, each of the sprocket teeth TH1 to TH6 may include the plurality of first teeth TW1 and the plurality of second teeth TW2.

The first chain-engagement axial width L1 of each first tooth TW1 is larger than an inner link space P1 defined between a pair of inner link plates 2a of the bicycle chain 2, and is smaller than an outer link space P2 defined between a pair of outer link plates 2b of the bicycle chain 2. The second chain-engagement axial width L2 of each second tooth TW2 is smaller than the inner link space P1 of the bicycle chain 2.

In each of the sets of sprocket teeth TH1 to TH6 in the first to sixth sprockets SP1 to SP6, all may be configured to have a chain-engagement axial width smaller than the inner link space P1 of the bicycle chain 2. Only specific one or more of the first to sixth sprockets SP1 to SP6 may include the first teeth TW1, each of which has the first chain-engagement axial width L1, and the second teeth TW2, each of which has the second chain-engagement axial width L2 smaller than the first chain-engagement axial width L1.

Preferably, the first teeth TW1 and the second teeth TW2 are alternately disposed in the circumferential direction about the rotational center axis X. Each first tooth TW1 is disposed between a pair of outer link plates 2b of the bicycle chain 2. Each second tooth TW2 is disposed between a pair of inner link plates 2a of the bicycle chain 2.

The sets of a plurality of sprocket teeth TH7 to TH9 in the seventh to ninth sprockets SP7 to SP9 have chain-engagement axial widths substantially equal to each other. Each of the sets of a plurality of sprocket teeth TH7 to TH9 has substantially the same configuration as a conventional set of sprocket teeth, and therefore, will be briefly explained.

Each of the sets of a plurality of sprocket teeth TH7 to TH9 is provided in alignment in the circumferential direction about the rotational center axis X. Each of the sets of a plurality of sprocket teeth TH7 to TH9 is disposed between a pair of outer link plates 2b and a pair of the inner link plates 2a.

Each of the sets of a plurality of sprockets TH7 to TH9 in the seventh to ninth sprockets SP7 to SP9 may include the first teeth TW1, each of which has the first chain-engagement axial width L1, and the second teeth TW2, each of which has the second chain-engagement axial width L2 smaller than the first chain-engagement axial width L1. Only specific one or more of the seventh to ninth sprockets SP7 to SP9 may include the first teeth TW1, each of which has the first chain-engagement axial width L1, and the second teeth TW2, each of which has the second chain-engagement axial width L2 smaller than the first chain-engagement axial width L1.

As shown in FIGS. 3A and 3B, each of the plurality of sprockets SP1 and SP4 includes the upshifting initiation teeth THn_b1, the axially recessed teeth THn_a1 and THn_a2 disposed in the upshifting facilitation areas URn, the downshifting finally engaged teeth THn_b2, and the axially recessed teeth THn_a3 and THn_a4 disposed in the downshifting facilitation areas DRn. "n" is any one of 1 and 4.

As shown in FIGS. 3A and 3B, each of the plurality of sprockets SP2, SP3, SP5 and SP6 includes the upshifting initiation teeth THn_b1, the axially recessed teeth THn_a1 and THn_a2 disposed in the upshifting facilitation areas URn, the downshifting finally engaged teeth THn_b2, and the axially recessed teeth THn_a3 and THn_a4 disposed in the downshifting facilitation areas DRn. "n" is any one of 2, 3, 5 and 6.

In the first to ninth sprockets SP1 to SP9, each of the plurality of sprockets SP7 and SP8 includes a plurality of sprocket teeth TH7 and TH8. As shown in FIGS. 4 and 5, each of the plurality of sprockets SP7 and SP8 includes the upshifting initiation tooth THn_b3, the axially recessed teeth THn_a5 and THn_a9 disposed in the upshifting facilitation area URn, the downshifting finally engaged teeth THn_b4, and the axially recessed teeth THn_a6, THn_a7, THn_a8 and THn_a9 disposed in the downshifting facilitation areas DRn. "n" is any one of 7 and 8.

In the present embodiment, each of the first to fourth sprockets SP1 to SP4 includes three upshifting facilitation areas and three downshifting facilitation areas. Moreover, each of the fifth and sixth sprockets SP5 and SP6 includes two upshifting facilitation areas and two downshifting facilitation areas. Furthermore, each of the seventh and eighth sprockets SP7 and SP8 includes one upshifting facilitation area and two downshifting facilitation areas. In the first to ninth sprockets SP1 to SP9, the sprocket SP9 includes a plurality of sprocket teeth TH9. In the present embodiment, the sprocket SP9 is not provided with any upshifting facilitation area UR and any downshifting facilitation area DR.

Features of Sprockets

Total Number of Teeth

Each of the at least two coaxially arranged sprockets in the first to ninth sprockets SP1 to SP9 has a total tooth number that is equal to or larger than eighteen. Specifically, each of the at least five coaxially arranged sprockets in the first to ninth sprockets SP1 to SP9 has the total tooth number that is equal to or larger than eighteen. In the present embodiment, as shown in FIG. 9, the total tooth number of each of the first to sixth sprockets SP1 to SP6 is equal to or larger than eighteen. In the present embodiment, the total tooth number of each of the seventh to ninth sprockets SP7 to SP9 is smaller than eighteen.

The total tooth number of at least one of the first to ninth sprockets SP1 to SP9 is an even number. In other words, the total tooth number of at least one of the at least five coaxially arranged sprockets in the first to ninth sprockets SP1 to SP9 is an even number.

In the present embodiment, the total tooth number of each of the at least five sprockets in the first to ninth sprockets SP1 to SP9 is an even number. More specifically, as shown in FIG. 9, the total tooth number of each of the first to sixth sprockets SP1 to SP6 is an even number. In the present embodiment, the total tooth number of each of the seventh to ninth sprockets SP7 to SP9 is an even number.

As shown in FIG. 9, the total tooth number of the first sprocket SP1 (an example of a total tooth number of the largest sprocket) is preferably equal to or larger than forty-four. The total tooth number of the ninth sprocket SP9 (an example of a total tooth number of the smallest sprocket) is preferably equal to or smaller than twelve.

For example, as shown in FIG. 9, the total tooth number of the first sprocket SP1 is forty-eight. The total tooth number of the second sprocket SP2 is forty-two. The total tooth number of the third sprocket SP3 is thirty-six. The total tooth number of the fourth sprocket SP4 is thirty. The total tooth number of the fifth sprocket SP5 is twenty-four. The total tooth number of the sixth sprocket SP6 is twenty. The total tooth number of the seventh sprocket SP7 is sixteen. The total tooth number of the eighth sprocket SP8 is fourteen. The total tooth number of the ninth sprocket SP9 is twelve. It should be noted that the total numbers of teeth of the respective sprockets SP1 to SP9 may be different from those described herein.

Tooth Number Difference

A tooth number difference is defined between a large sprocket of the at least two coaxially arranged sprockets in the first to ninth sprockets SP1 to SP9 and a small sprocket of the at least two coaxially arranged sprockets in the first to ninth sprockets SP1 to SP9.

In a condition that the large sprocket and the small sprocket of the at least two coaxially arranged sprockets are adjacent to each other without another sprocket therebetween in the axial direction with respect to the rotational center axis X, the tooth number difference between the large sprocket and the small sprocket is preferably equal to or smaller than seven as shown in FIG. 9. Specifically, the tooth number difference between the large sprocket and the small sprocket is preferably equal to or smaller than six.

For example, as shown in FIG. 9, the tooth number difference between the first and second sprockets SP1 and SP2 is six. The tooth number difference between the second and third sprockets SP2 and SP3 is six. The tooth number difference between the third and fourth sprockets SP3 and SP4 is six. The tooth number difference between the fourth and fifth sprockets SP4 and SP5 is six. The tooth number difference between the fifth and sixth sprockets SP5 and SP6 is four. In other words, the tooth number difference between the large sprocket and the small sprocket in the first to sixth sprockets SP1 to SP6 is equal to or smaller than six.

Here, a quotient resulting from the total tooth number of the large sprocket in two axially adjacent sprockets of the at least two coaxially arranged sprockets of the first to sixth sprockets SP1 to SP6 divided by half of the tooth number difference is an even number. A quotient resulting from the total tooth number of the large sprocket divided by the tooth number difference is an integer.

A quotient resulting from the total tooth number of the small sprocket in axially adjacent two sprockets of the at least two coaxially arranged sprockets of the first to sixth sprockets SP1 to SP6 divided by half of the tooth number difference is an even number. A quotient resulting from the total tooth number of the small sprocket divided by the tooth number difference is an integer.

It should be noted that the tooth number difference between the sixth and seventh sprockets SP6 and SP7 is four. The tooth number difference between the seventh and eighth sprockets SP7 and SP8 is two. The tooth number difference between the eighth and ninth sprockets SP8 and SP9 is two.

Tooth Number Transition

When the at least two coaxially arranged sprockets in the first to ninth sprockets SP1 to SP9 include the at least three coaxially arranged sprockets, a plurality of tooth number transitions of the at least two coaxially arranged sprockets are defined by a quotient in which the total tooth number of the large sprocket of the at least two coaxially arranged sprockets axially adjacent to each other is divided by the total tooth number of the small sprocket of the at least two coaxially arranged sprockets axially adjacent to each other. In this case, the large sprocket and the small sprocket are adjacent to each other without another sprocket therebetween in the axial direction.

A plurality of tooth number transitions of the at least five coaxially arranged sprockets in the first to ninth sprockets SP1 to SP9 are defined by a quotient in which the total tooth number of the large sprocket of the at least five coaxially arranged sprockets is divided by the total tooth number of the small sprocket of the at least five coaxially arranged sprockets. In this case, the large sprocket and the small sprocket are adjacent to each other without another sprocket therebetween in the axial direction.

In short, a plurality of tooth number transitions among the first to ninth sprockets SP1 to SP9 are defined by a quotient in which the total tooth number of the large sprocket of axially adjacent two sprockets is divided by the total tooth number of the small sprocket of the axially adjacent two sprockets.

As shown in FIG. 9, an average of the plurality of tooth number transitions among the first to ninth sprockets SP1 to SP9 is preferably equal to or smaller than 1.23. Specifically, the average of the plurality of tooth number transitions among the first to ninth sprockets SP1 to SP9 is preferably equal to or smaller than 1.2. The average of the plurality of tooth number transitions among the first to ninth sprockets SP1 to SP9 is preferably equal to or smaller than 1.19.

For example, the tooth number transition between the first and second sprockets SP1 and SP2 is 1.143. The tooth number transition between the second and third sprockets SP2 and SP3 is 1.167. The tooth number transition between the third and fourth sprockets SP3 and SP4 is 1.200. The tooth number transition between the fourth and fifth sprockets SP4 and SP5 is 1.250.

The tooth number transition between the fifth and sixth sprockets SP5 and SP6 is 1.200. The tooth number transition between the sixth and seventh sprockets SP6 and SP7 is 1.250. The tooth number transition between the seventh and eighth sprockets SP7 and SP8 is 1.143. The tooth number transition between the eighth and ninth sprockets SP8 and SP9 is 1.163.

When calculated with use of the plurality of tooth number transitions, the average of the plurality of tooth number transitions is derived as 1.19. In other words, in the present embodiment, the average of the plurality of tooth number transitions among the first to ninth sprockets SP1 to SP9 is equal to or smaller than 1.19.

Entire Gear Range

An entire gear range is defined as a ratio of the total tooth number of the first sprocket SP1 (the largest sprocket) to the total tooth number of the ninth sprocket SP9 (the smallest sprocket).

The entire gear range is preferably larger than or equal to 350%. Specifically, the entire gear range is preferably larger than or equal to 400%. Additionally, the entire gear range is preferably equal to or smaller than 600%.

For example, in the present embodiment, as described above, the total tooth number of the first sprocket SP1 is forty-eight, whereas the total tooth number of the ninth sprocket SP9 is twelve. In this case, the entire gear range is 400%. In other words, in the present embodiment, the entire gear range is equal to or larger than 350% and is equal to or larger than 400%. Additionally, in the present embodiment, the entire gear range is equal to or smaller than 600%.

Engaged form between Sprocket and Bicycle Chain in Gear Shifting operation) Explanation will be herein provided for an engaged form between one sprocket and the bicycle chain 2 in each of the upshifting operation and the downshifting operation in the present embodiment.

Up Shifting Operation

In the upshifting operation, the bicycle chain 2 is led, by a rear derailleur 7 (see FIG. 1), from the small sprocket of the axially adjacent two sprockets in the first to ninth sprockets SP1 to SP9 to the large sprocket of the axially adjacent two sprockets in the first to ninth sprockets SP1 to SP9.

For ease of explanation, the engaged form between one sprocket and the bicycle chain 2 in the upshifting operation will be herein explained with the use of combinations of the first and second sprockets SP1 and SP2, the second and third sprockets SP2 and SP3, and the seventh and eighth sprockets SP7 and SP8.

For example, when the rear derailleur 7 performs the upshifting operation while the bicycle chain 2 is wrapped around the bicycle front sprocket assembly 4 and the second sprocket SP2, the upshifting initiation tooth TH1_$b$1 in one upshifting facilitation area UR1 of the first sprocket SP1 (the large sprocket) is disposed between a pair of outer link plates.

At this time, one of a pair of inner link plates opposed to each other, which is located on the lengthwise directional center surface LP side of the bicycle 1 while the bicycle chain 2 is mounted to the bicycle 1, is disposed in the recess of the axially recessed tooth TH1_$a$1. One of a pair of outer link plates opposed to each other, which is located on the lengthwise directional center surface LP side of the bicycle 1 while the bicycle chain 2 is mounted to the bicycle 1, is disposed in the recess of the axially recessed tooth TH1_$a$2.

When the plurality of sprockets SP1 to SP9 is unitarily rotated in this condition, the bicycle chain 2 is engaged with the upshifting initiation tooth TH1_$b$1 and is then sequentially engaged with sprocket teeth located upstream of this upshifting initiation tooth TH1_$b$1 in a drive rotational direction R on the first sprocket SP1 (the large sprocket). Accordingly, the bicycle chain 2 shifts from the second sprocket SP2 (the small sprocket) to the first sprocket SP1 (the large sprocket).

It should be noted that when the rear derailleur 7 performs the upshifting operation while the bicycle chain 2 is wrapped around the bicycle front sprocket assembly 4 and the fifth sprocket SP5, the bicycle chain 2 also similarly shifts from the fifth sprocket SP5 (the small sprocket) to the fourth sprocket SP4 (the large sprocket).

Additionally, when the rear derailleur 7 performs the upshifting operation while the bicycle chain 2 is wrapped around the bicycle front sprocket assembly 4 and the third sprocket SP3, for example, the upshifting initiation tooth TH2_$b$1 in one upshifting facilitation area UR2 of the second sprocket SP2 (the large sprocket) is disposed between a pair of outer link plates.

At this time, one of a pair of inner link plates opposed to each other, which is located on the lengthwise directional center surface LP side of the bicycle 1 while the bicycle chain 2 is mounted to the bicycle 1, is disposed in the recess of the axially recessed tooth TH2_$a$1. One of a pair of outer link plates opposed to each other, which is located on the lengthwise directional center surface LP side of the bicycle 1 while the bicycle chain 2 is mounted to the bicycle 1, is disposed in the recess of the axially recessed tooth TH2_$a$2.

When the plurality of sprockets SP1 to SP9 is unitarily rotated in this condition, the bicycle chain 2 is engaged with the upshifting initiation tooth TH2_$b$1 and is then sequentially engaged with sprocket teeth located upstream of this upshifting initiation tooth TH2_$b$1 in the drive rotational direction R on the second sprocket SP2 (the large sprocket). Accordingly, the bicycle chain 2 shifts from the third sprocket SP3 (the small sprocket) to the second sprocket SP2 (the large sprocket).

It should be noted that when the rear derailleur 7 performs the upshifting operation while the bicycle chain 2 is wrapped around the bicycle front sprocket assembly 4 and any one of the sprockets SP3, SP4, SP6 and SP7, the bicycle chain 2 also similarly shifts from the small sprocket to the large sprocket.

Moreover, when the rear derailleur 7 performs the upshifting operation while the bicycle chain 2 is wrapped around the bicycle front sprocket assembly 4 and the eighth sprocket SP8, for example, the upshifting initiation tooth TH7_$b$3 in the upshifting facilitation area UR7 of the seventh sprocket SP7 (the large sprocket) is disposed between a pair of outer link plates.

At this time, one of a pair of inner link plates opposed to each other, which is located on the lengthwise directional center surface LP side of the bicycle 1 while the bicycle chain 2 is mounted to the bicycle 1, is disposed in the recess of the axially recessed tooth TH7_$a5$. One of a pair of outer link plates opposed to each other, which is located on the lengthwise directional center surface LP side of the bicycle 1 while the bicycle chain 2 is mounted to the bicycle 1, is disposed in the recess of the axially recessed tooth TH7_$a9$.

When the plurality of sprockets SP1 to SP9 is unitarily rotated in this condition, the bicycle chain 2 is engaged with the upshifting initiation tooth TH7_$b3$ and is then sequentially engaged with sprocket teeth located upstream of this upshifting initiation tooth TH7_$b3$ in the drive rotational direction R on the seventh sprocket SP7 (the large sprocket). Accordingly, the bicycle chain 2 shifts from the eighth sprocket SP8 (the small sprocket) to the seventh sprocket SP7 (the large sprocket).

It should be noted that when the rear derailleur 7 performs the upshifting operation while the bicycle chain 2 is wrapped around the bicycle front sprocket assembly 4 and the ninth sprocket SP9, the bicycle chain 2 also similarly shifts from the ninth sprocket SP9 (the small sprocket) to the eighth sprocket SP8 (the large sprocket).

Downshifting Operation

In the downshifting operation, the bicycle chain 2 is led, by the rear derailleur 7 (see FIG. 1), from the large sprocket of the axially adjacent two sprockets in the first to ninth sprockets SP1 to SP9 to the small sprocket of the axially adjacent two sprockets in the first to ninth sprockets SP1 to SP9.

For ease of explanation, the engaged form between one sprocket and the bicycle chain 2 in the downshifting operation will be herein explained with the use of combinations of the first and second sprockets SP1 and SP2 and the seventh and eighth sprockets SP7 and SP8.

For example, the rear derailleur 7 performs the downshifting operation while the bicycle chain 2 is wrapped around the bicycle front sprocket assembly 4 and the first sprocket SP1.

In this case, while the downshifting finally engaged tooth TH1_$b2$ in one downshifting facilitation area DR1 of the first sprocket SP1 (the large sprocket) is disposed between a pair of outer link plates, one of a pair of inner link plates opposed to each other, which is located on the lengthwise directional center surface LP side of the bicycle 1 while the bicycle chain 2 is mounted to the bicycle 1, is disposed in the recess of the axially recessed tooth TH1_$a3$. At this time, one of a pair of outer link plates opposed to each other, which is located on the lengthwise directional center surface LP side of the bicycle 1 while the bicycle chain 2 is mounted to the bicycle 1, is disposed in the recess of the axially recessed tooth TH1_$a4$.

When the plurality of sprockets SP1 to SP9 is unitarily rotated in this condition, the bicycle chain 2 is sequentially disengaged from sprocket teeth located upstream of the downshifting finally engaged tooth TH1_$b2$ in the drive rotational direction R on the first sprocket SP1 (the large sprocket). Accordingly, the bicycle chain 2 shifts from the first sprocket SP1 (the large sprocket) to the second sprocket SP2 (the small sprocket).

It should be noted that when the downshifting operation is performed while the bicycle chain 2 is wrapped around the bicycle front sprocket assembly 4 and any one of the second to sixth sprockets SP2 to SP6, the bicycle chain 2 also similarly shifts from the large sprocket to the small sprocket.

Additionally, while the bicycle chain 2 is wrapped around the bicycle front sprocket assembly 4 and the seventh sprocket SP7, for example, the rear derailleur 7 performs the downshifting operation.

In this case, while the downshifting finally engaged tooth TH7_$b41$ in one downshifting facilitation area DR7 of the seventh sprocket SP7 (the large sprocket) is disposed between a pair of outer link plates, one of a pair of inner link plates opposed to each other, which is located on the lengthwise directional center surface LP side of the bicycle 1 while the bicycle chain 2 is mounted to the bicycle 1, is disposed in the recess of the axially recessed tooth TH7_$a6$. At this time, one of a pair of outer link plates opposed to each other, which is located on the lengthwise directional center surface LP side of the bicycle 1 while the bicycle chain 2 is mounted to the bicycle 1, is disposed in the recess of the axially recessed tooth TH7_$a9$.

On the other hand, while the downshifting finally engaged tooth TH1_$b42$ in the other downshifting facilitation area DR7 of the seventh sprocket SP7 (the large sprocket) is disposed between a pair of outer link plates, one of a pair of inner link plates opposed to each other, which is located on the lengthwise directional center surface LP side of the bicycle 1 while the bicycle chain 2 is mounted to the bicycle 1, is disposed in the recess of the axially recessed tooth TH7_$a7$. At this time, one of a pair of outer link plates, which is located on the lengthwise directional center surface LP side of the bicycle 1 while the bicycle chain 2 is mounted to the bicycle 1, is disposed in the recess of the axially recessed tooth TH7_$a8$.

When the plurality of sprockets SP1 to SP9 is unitarily rotated in this condition, the bicycle chain 2 is sequentially disengaged from sprocket teeth located upstream of the downstream finally engaged tooth TH7_$b41$, TH7_$b42$ in the drive rotational direction R on the seventh sprocket SP7 (the large sprocket). Accordingly, the bicycle chain 2 shifts from the seventh sprocket SP7 (the large sprocket) to the eighth sprocket SP8 (the small sprocket).

It should be noted that when the downshifting operation is performed while the bicycle chain 2 is wrapped around the bicycle front sprocket assembly 4 and the eighth sprocket SP8, the bicycle chain 2 also similarly shifts from the large sprocket to the small sprocket.

Other Embodiments

One embodiment of the present invention has been explained above. However, the present invention is not limited to the aforementioned embodiment, and a variety of changes can be made without departing from the gist of the present invention. Especially, embodiments described in the present specification can be arbitrarily combined on an as-needed basis.

(A) In the aforementioned embodiment, the exemplary case has been described that the plurality of sprockets SP1 to SP9 is separated from each other. However, at least two of the plurality of sprockets SP1 to SP9 may be integrated. Furthermore, all of the plurality of sprockets SP1 to SP9 may be integrated.

(B) In the aforementioned embodiment, the sprocket assembly has been explained with use of the nine sprockets SP1 to SP9. However, the total number of a plurality of sprockets may be equal to or larger than ten or equal to or smaller than fifteen. Furthermore, the total number of a plurality of sprockets may be equal to or smaller than eight.

(C) In the aforementioned embodiment, the exemplary case has been described that the lower limit of tooth number difference is two. However, the lower limit of tooth number difference may be one.

(D) In the aforementioned embodiment, the exemplary case has been described that the first to eighth sprockets SP1 to SP8 include the upshifting facilitation areas UR1 to UR8 and the downshifting facilitation areas DR1 to DR8. Instead of this, as long as the first to sixth sprockets SP1 to SP6 include the upshifting facilitation areas UR1 to UR6 and the downshifting facilitation areas DR 1 to DR6, the seventh and eighth sprockets SP7 and SP8 may not include the upshifting facilitation areas UR7 and UR8 and the downshifting facilitation areas DR7 and DR8.

(E) In the aforementioned embodiment, the exemplary case has been described that the nine sprockets SP1 to SP9, i.e., the first to ninth sprockets SP1 to SP9 have the features shown in FIG. 9. In the first to ninth sprockets SP1 to SP9 having the features shown in FIG. 9, the first to sixth sprockets SP1 to SP6 correspond to "the at least two coaxially arranged sprockets," "the at least three coaxially arranged sprockets," and "the at least five coaxially arranged sprockets."

Instead of this, the first to ninth sprockets SP1 to SP9 may be configured to have the features shown in FIG. 10A. In this case, in the first to ninth sprockets SP1 to SP9 having the features shown in FIG. 10A, the first to sixth sprockets SP1 to SP6 correspond to "the at least two coaxially arranged sprockets," "the at least three coaxially arranged sprockets," and "the at least five coaxially arranged sprockets."

(F) In the aforementioned embodiment, the exemplary case has been described that the bicycle rear sprocket assembly 5 includes nine sprockets SP1 to SP9, i.e., the first to ninth sprockets SP1 to SP9.

The bicycle rear sprocket assembly 5 may further include a tenth sprocket SP10. In this case, the bicycle rear sprocket assembly 5 includes ten sprockets SP1 to SP10, i.e., the first to tenth sprockets SP1 to SP10.

In this configuration, the first to tenth sprockets SP1 to SP10 may be configured to have, for example, the features shown in FIG. 10B. In the first to tenth sprockets SP1 to SP10 having the features shown in FIG. 10B, the first to seventh sprockets SP1 to SP7 correspond to "the at least two coaxially arranged sprockets," "the at least three coaxially arranged sprockets," and "the at least five coaxially arranged sprockets."

It should be noted that the bicycle rear sprocket assembly 5 may include 11 or more sprockets. Furthermore, the bicycle rear sprocket assembly 5 may include 16 or fewer sprockets.

(G) In the embodiment shown in FIG. 8, the first teeth TW1 have a "+" shape as seen from outside in a radial direction about the rotational center axis X of the corresponding sprocket. However, the present invention is not limited to this. The first teeth TW1 may have a "T" shape or a polygonal shape such as a hexagonal shape or an octagonal shape, as seen from outside in the radial direction about the rotational center axis X of the corresponding sprocket.

When the first teeth TW1 herein have the "T" shape as seen from outside in the radial direction about the rotational center axis X of the corresponding sprocket, even if the first chain-engagement axial width L1 of the first teeth TW1 is set to be larger than the inner link space P1 defined between a pair of inner link plates 2a of the bicycle chain 2, it becomes easy to well maintain the gear shifting operation in the bicycle rear sprocket assembly 5.

REFERENCE CHARACTERS LIST

5 Bicycle rear sprocket assembly
SP1 to SP10 First to ninth sprockets
SP1 to SP6 First to sixth sprockets
UR Upshifting facilitation area
DR Downshifting facilitation area
$THn\_b1$, $THn\_b3$ (n=1 to 9) Upshifting Initiation teeth
$THn\_b2$, $THn\_b41$, $THn\_b42$ (n=1 to 9) Downshifting finally engaged teeth
$THn\_am$ (n=1 to 9, m=1 to 9) Axially recessed teeth
X Rotational center axis

What is claimed is:

1. A bicycle rear sprocket assembly comprising:
a plurality of sprockets including at least two coaxially arranged sprockets, a total tooth number of at least one of the plurality of sprockets being an even number, wherein
at least one of the plurality of sprockets includes a plurality of sprocket teeth configured to engage a bicycle chain;
the plurality of sprocket teeth includes a first tooth having a first chain-engagement axial width and a second tooth having a second chain-engagement axial width that is smaller than the first chain-engagement axial width;
the first chain-engagement axial width of the first tooth is larger than an inner link space defined between a pair of inner link plates of the bicycle chain and smaller than an outer link space defined between a pair of outer link plates of the bicycle chain;
the second chain-engagement axial width of the second tooth is smaller than the inner link space of the bicycle chain;
at least one of the at least two coaxially arranged sprockets has an upshifting facilitation area and a downshifting facilitation area;
each of the at least two coaxially arranged sprockets has a total tooth number that is equal to or larger than eighteen;
a tooth number difference is defined between a large sprocket of the at least two coaxially arranged sprockets and a small sprocket of the at least two coaxially arranged sprockets;
the large sprocket and the small sprocket are adjacent to each other without another sprocket therebetween in an axial direction with respect to a rotational center axis of the at least two coaxially arranged sprockets;
the tooth number difference is equal to or smaller than seven;
an entire gear range is defined as a ratio of a total tooth number of a largest sprocket of the plurality of sprockets to a total tooth number of a smallest sprocket of the plurality of sprockets; and
the entire gear range is equal to or larger than 350%.

2. The bicycle rear sprocket assembly according to claim 1, wherein
the at least two coaxially arranged sprockets include at least three coaxially arranged sprockets;
a plurality of tooth number transitions of the at least two coaxially arranged sprockets are defined by a quotient in which a total tooth number of the large sprocket of the at least two coaxially arranged sprockets is divided by a total tooth number of the small sprocket of the at least two coaxially arranged sprockets; and an average of the plurality of tooth number transitions is equal to or smaller than 1.23.

3. The bicycle rear sprocket assembly according to claim 2, wherein
the average of the plurality of tooth number transitions is equal to or smaller than 1.2.

4. The bicycle rear sprocket assembly according to claim 3, wherein
the average of the plurality of tooth number transitions is equal to or smaller than 1.19.

5. The bicycle rear sprocket assembly according to claim 2, wherein
the at least two coaxially arranged sprockets include at least five coaxially arranged sprockets.

6. The bicycle rear sprocket assembly according to claim 5, wherein
the plurality of tooth number transitions are defined by a quotient in which a total tooth number of a large sprocket of the at least five coaxially arranged sprockets is divided by a total tooth number of a small sprocket of the at least five coaxially arranged sprockets;
the large sprocket and the small sprocket are adjacent to each other without another sprocket therebetween in the axial direction.

7. The bicycle rear sprocket assembly according to claim 5, wherein
each of the at least five coaxially arranged sprockets has a total tooth number that is equal to or larger than eighteen; and
at least one of the at least five coaxially arranged sprockets includes the plurality of sprocket teeth.

8. The bicycle rear sprocket assembly according to claim 1, wherein
a quotient resulting from the total tooth number of the large sprocket divided by half of the tooth number difference is an even number.

9. The bicycle rear sprocket assembly according to claim 1, wherein
a quotient resulting from the total tooth number of the small sprocket divided by half of the tooth number difference is an even number.

10. The bicycle rear sprocket assembly according to claim 1, wherein
a quotient resulting from the total tooth number of the large sprocket divided by the tooth number difference is an integer.

11. The bicycle rear sprocket assembly according to claim 1, wherein
a quotient resulting from the total tooth number of the small sprocket divided by the tooth number difference is an integer.

12. The bicycle rear sprocket assembly according to claim 1, wherein
the large sprocket has the upshifting facilitation area and the downshifting facilitation area.

13. The bicycle rear sprocket assembly according to claim 12, wherein
the small sprocket has an additional upshifting facilitation area and an additional downshifting facilitation area.

14. The bicycle rear sprocket assembly according to claim 1, wherein
an axially recessed tooth in the axial direction is disposed in at least one of the upshifting facilitation area and the downshifting facilitation area.

15. The bicycle rear sprocket assembly according to claim 1, wherein
the entire gear range is equal to or larger than 400%.

16. The bicycle rear sprocket assembly according to claim 1, wherein
the total tooth number of the smallest sprocket of the plurality of sprockets is equal to or smaller than twelve.

17. The bicycle rear sprocket assembly according to claim 1, wherein
the total tooth number of the largest sprocket of the plurality of sprockets is equal to or larger than forty-four.

18. The bicycle rear sprocket assembly according to claim 1, wherein
a total number of the at least two coaxially arranged sprockets is equal to or larger than nine.

19. The bicycle rear sprocket assembly according to claim 1, wherein
the tooth number difference is equal to or smaller than six.

20. A bicycle rear sprocket assembly comprising:
a plurality of sprockets including at least five coaxially arranged sprockets, a total tooth number of at least one of the at least five coaxially arranged sprockets being an even number, wherein
at least one of the plurality of sprockets includes a plurality of sprocket teeth configured to engage a bicycle chain;
the plurality of sprocket teeth includes a first tooth having a first chain-engagement axial width and a second tooth having a second chain-engagement axial width that is smaller than the first chain-engagement axial width;
the first chain-engagement axial width of the first tooth is larger than an inner link space defined between a pair of inner link plates of the bicycle chain and smaller than an outer link space defined between a pair of outer link plates of the bicycle chain;
the second chain-engagement axial width of the second tooth is smaller than the inner link space of the bicycle chain;
at least one of the at least five coaxially arranged sprockets has an upshifting facilitation area and a downshifting facilitation area;
a plurality of tooth number transitions of the at least five coaxially arranged sprockets are defined by a quotient in which a total tooth number of a large sprocket of the at least five coaxially arranged sprockets is divided by a total tooth number of a small sprocket of the at least five coaxially arranged sprockets;
the large sprocket and the small sprocket are adjacent to each other without another sprocket therebetween in an axial direction with respect to a rotational center axis of the at least five coaxially arranged sprockets;
an average of the plurality of tooth number transitions is equal to or smaller than 1.23;
an entire gear range is defined as a ratio of a total tooth number of a largest sprocket of the plurality of sprockets to a total tooth number of a smallest sprocket of the plurality of sprockets; and
the entire gear range is equal to or larger than 350%.

21. The bicycle rear sprocket assembly according to claim 20, wherein
the average of the plurality of tooth number transitions is equal to or smaller than 1.2.

22. The bicycle rear sprocket assembly according to claim 20, wherein
the average of the plurality of tooth number transitions is equal to or smaller than 1.19.

23. A bicycle rear sprocket assembly comprising:
a plurality of sprockets including at least two coaxially arranged sprockets, a total tooth number of at least one of the plurality of sprockets being an even number, wherein
at least one of the plurality of sprockets includes a plurality of sprocket teeth configured to engage a bicycle chain;
the plurality of sprocket teeth includes a first tooth having a first chain-engagement axial width and a second tooth having a second chain-engagement axial width that is smaller than the first chain-engagement axial width;
the first chain-engagement axial width of the first tooth is larger than an inner link space defined between a pair of inner link plates of the bicycle chain and smaller than an outer link space defined between a pair of outer link plates of the bicycle chain;
the second chain-engagement axial width of the second tooth is smaller than the inner link space of the bicycle chain;
at least one of the at least two coaxially arranged sprockets has an upshifting facilitation area and a downshifting facilitation area;
each of the at least two coaxially arranged sprockets has a total tooth number that is equal to or larger than eighteen;
a tooth number difference is defined between a large sprocket of the at least two coaxially arranged sprockets and a small sprocket of the at least two coaxially arranged sprockets;
the large sprocket and the small sprocket are adjacent to each other without another sprocket therebetween in an axial direction with respect to a rotational center axis of the at least two coaxially arranged sprockets;
the tooth number difference is equal to or smaller than seven; and
a total tooth number of a largest sprocket of the plurality of sprockets is equal to or larger than forty-four.

24. A bicycle rear sprocket assembly comprising:
a plurality of sprockets including at least five coaxially arranged sprockets, a total tooth number of at least one of the at least five coaxially arranged sprockets being an even number, wherein
at least one of the plurality of sprockets includes a plurality of sprocket teeth configured to engage a bicycle chain;
the plurality of sprocket teeth includes a first tooth having a first chain-engagement axial width and a second tooth having a second chain-engagement axial width that is smaller than the first chain-engagement axial width;
the first chain-engagement axial width of the first tooth is larger than an inner link space defined between a pair of inner link plates of the bicycle chain and smaller than an outer link space defined between a pair of outer link plates of the bicycle chain;
the second chain-engagement axial width of the second tooth is smaller than the inner link space of the bicycle chain;
at least one of the at least five coaxially arranged sprockets has an upshifting facilitation area and a downshifting facilitation area;
a plurality of tooth number transitions of the at least five coaxially arranged sprockets are defined by a quotient in which a total tooth number of a large sprocket of the at least five coaxially arranged sprockets is divided by a total tooth number of a small sprocket of the at least five coaxially arranged sprockets;
the large sprocket and the small sprocket are adjacent to each other without another sprocket therebetween in an axial direction with respect to a rotational center axis of the at least five coaxially arranged sprockets;
an average of the plurality of tooth number transitions is equal to or smaller than 1.23; and
a total tooth number of a largest sprocket of the plurality of sprockets is equal to or larger than forty-four.

\* \* \* \* \*